(12) United States Patent
Vange et al.

(10) Patent No.: US 10,033,840 B2
(45) Date of Patent: Jul. 24, 2018

(54) SYSTEM AND DEVICES FACILITATING DYNAMIC NETWORK LINK ACCELERATION

(71) Applicant: Circadence Corporation, Boulder, CO (US)

(72) Inventors: Mark Vange, Scottsdale, AZ (US); Mark Plumb, Toronto (CA); Michael Kouts, Toronto (CA); Glenn Sydney Wilson, Toronto (CA); Paul Randy Thornton, Tupelo, MS (US); Marlin Popeye McFate, Guntown, MS (US); Robert John Shaughnessy, Springfield, VA (US)

(73) Assignee: Circadence Corporation, Boulder, CO (US)

( * ) Notice: Subject to any disclaimer, the term of this patent is extended or adjusted under 35 U.S.C. 154(b) by 0 days.

(21) Appl. No.: 15/496,741

(22) Filed: Apr. 25, 2017

(65) Prior Publication Data
US 2017/0324845 A1 Nov. 9, 2017

Related U.S. Application Data

(60) Continuation of application No. 14/918,652, filed on Oct. 21, 2015, which is a continuation of application
(Continued)

(51) Int. Cl.
*H04L 12/28* (2006.01)
*H04L 29/06* (2006.01)
(Continued)

(52) U.S. Cl.
CPC ............. *H04L 69/10* (2013.01); *H04L 41/12* (2013.01); *H04L 67/101* (2013.01);
(Continued)

(58) Field of Classification Search
None
See application file for complete search history.

(56) References Cited

U.S. PATENT DOCUMENTS

| | | |
|---|---|---|
| 5,130,982 A | 7/1992 | Ash et al. |
| 5,258,983 A | 11/1993 | Lane et al. |

(Continued)

FOREIGN PATENT DOCUMENTS

| | | |
|---|---|---|
| EP | 0774878 | 8/1997 |
| EP | 0794491 | 9/1997 |

(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner* — Alex Skripnikov
(74) *Attorney, Agent, or Firm* — Weide & Miller, Ltd.

(57) ABSTRACT

A peer to peer dynamic network acceleration method and apparatus provide enhanced communications directly between two or more enhanced devices, such as enhanced clients. The enhanced clients may comprise a front-end, a back-end, or both. In general, the front-end and back-end of the enhanced clients work in concert to translate data into an enhanced protocol for communication between the enhanced clients. The enhanced protocol may provide acceleration, security, error correction, and other benefits. Data from various applications may be seamlessly translated between a first protocol and the enhanced protocol, such that the applications need not be modified to use the enhanced (Continued)

protocol. The enhanced clients may automatically detect one another to establish an enhanced communications channel automatically.

6 Claims, 15 Drawing Sheets

Related U.S. Application Data

No. 14/158,255, filed on Jan. 17, 2014, which is a continuation of application No. 13/023,460, filed on Feb. 8, 2011, which is a continuation-in-part of application No. 12/584,938, filed on Sep. 14, 2009, now Pat. No. 8,195,823, which is a continuation-in-part of application No. 11/346,767, filed on Feb. 3, 2006, now Pat. No. 7,975,066, which is a division of application No. 09/835,876, filed on Apr. 16, 2001, now Pat. No. 7,127,518.

(60) Provisional application No. 60/197,490, filed on Apr. 17, 2000.

(51) Int. Cl.
*H04L 29/08* (2006.01)
*H04L 12/24* (2006.01)

(52) U.S. Cl.
CPC ...... *H04L 67/1008* (2013.01); *H04L 67/1031* (2013.01); *H04L 67/141* (2013.01); *H04L 67/143* (2013.01); *H04L 67/2823* (2013.01); *H04L 67/2876* (2013.01); *H04L 67/42* (2013.01); *H04L 69/04* (2013.01); *H04L 69/08* (2013.01); *H04L 63/0227* (2013.01); *H04L 63/0428* (2013.01); *H04L 67/1029* (2013.01); *H04L 69/329* (2013.01)

(56) References Cited

U.S. PATENT DOCUMENTS

| | | | |
|---|---|---|---|
| 5,307,413 A * | 4/1994 | Denzer | H04L 69/04 370/473 |
| 5,446,736 A | 8/1995 | Gleeson et al. | |
| 5,539,884 A | 7/1996 | Robrock, II | |
| 5,548,646 A | 8/1996 | Aziz et al. | |
| 5,673,322 A | 9/1997 | Pepe et al. | |
| 5,717,745 A | 2/1998 | Vijay et al. | |
| 5,742,772 A | 4/1998 | Sreenan | |
| 5,754,774 A | 5/1998 | Bittinger et al. | |
| 5,757,771 A | 5/1998 | Li et al. | |
| 5,793,498 A | 8/1998 | Scholl et al. | |
| 5,808,203 A | 9/1998 | Nolan, Jr. et al. | |
| 5,887,132 A | 3/1999 | Leung et al. | |
| 5,933,412 A | 8/1999 | Choudhury et al. | |
| 5,951,694 A | 9/1999 | Choquier et al. | |
| 5,956,330 A | 9/1999 | Kerns | |
| 5,956,341 A | 9/1999 | Galand et al. | |
| 5,999,971 A | 12/1999 | Buckland | |
| 6,006,264 A | 12/1999 | Colby et al. | |
| 6,023,456 A | 2/2000 | Chapman et al. | |
| 6,034,964 A | 3/2000 | Fukushima et al. | |
| 6,070,192 A | 5/2000 | Holt et al. | |
| 6,078,582 A | 6/2000 | Curry et al. | |
| 6,081,900 A | 6/2000 | Subramaniam et al. | |
| 6,097,733 A * | 8/2000 | Basu | H04L 29/06027 370/329 |
| 6,128,505 A | 10/2000 | Sipila | |
| 6,167,449 A | 12/2000 | Arnold et al. | |
| 6,226,680 B1 | 5/2001 | Boucher et al. | |
| 6,247,060 B1 | 6/2001 | Boucher et al. | |
| 6,272,492 B1 | 8/2001 | Kay | |
| 6,286,058 B1 | 9/2001 | Hrastar et al. | |
| 6,310,894 B1 | 10/2001 | Counterman | |
| 6,324,683 B1 | 11/2001 | Fuh et al. | |
| 6,334,153 B2 | 12/2001 | Boucher et al. | |
| 6,336,137 B1 | 1/2002 | Lee et al. | |
| 6,366,947 B1 | 4/2002 | Kavner | |
| 6,381,228 B1 | 4/2002 | Prieto, Jr. et al. | |
| 6,389,479 B1 | 5/2002 | Boucher et al. | |
| 6,393,487 B2 | 5/2002 | Boucher et al. | |
| 6,427,171 B1 | 7/2002 | Craft et al. | |
| 6,427,173 B1 | 7/2002 | Boucher et al. | |
| 6,434,139 B1 | 8/2002 | Liu et al. | |
| 6,434,620 B1 | 8/2002 | Boucher et al. | |
| 6,446,110 B1 | 9/2002 | Lection et al. | |
| 6,470,415 B1 | 10/2002 | Starr et al. | |
| 6,490,278 B1 | 12/2002 | Michelson et al. | |
| 6,490,619 B1 | 12/2002 | Byrne et al. | |
| 6,525,268 B1 | 2/2003 | Sellers | |
| 6,535,925 B1 | 3/2003 | Svanbro et al. | |
| 6,560,197 B1 | 5/2003 | LeVieux et al. | |
| 6,591,288 B1 | 7/2003 | Edwards et al. | |
| 6,591,302 B2 | 7/2003 | Boucher et al. | |
| 6,594,268 B1 | 7/2003 | Aukia et al. | |
| 6,603,970 B1 | 8/2003 | Huelamo Platas et al. | |
| 6,615,235 B1 | 9/2003 | Copeland et al. | |
| 6,640,248 B1 | 10/2003 | Jorgensen | |
| 6,643,260 B1 | 11/2003 | Kloth | |
| 6,657,957 B1 | 12/2003 | Cheung et al. | |
| 6,658,480 B2 | 12/2003 | Boucher et al. | |
| 6,665,872 B1 | 12/2003 | Krishnamurthy et al. | |
| 6,687,758 B2 | 2/2004 | Craft et al. | |
| 6,697,851 B1 | 2/2004 | Althaus et al. | |
| 6,697,868 B2 | 2/2004 | Craft et al. | |
| 6,714,979 B1 | 3/2004 | Brandt et al. | |
| 6,728,208 B1 | 4/2004 | Puuskari | |
| 6,728,748 B1 | 4/2004 | Mangipudi et al. | |
| 6,728,963 B1 | 4/2004 | Forin et al. | |
| 6,732,175 B1 | 5/2004 | Abjanic | |
| 6,751,665 B2 | 6/2004 | Philbrick et al. | |
| 6,757,746 B2 | 6/2004 | Boucher et al. | |
| 6,760,308 B1 | 7/2004 | Ghanma et al. | |
| 6,760,336 B1 | 7/2004 | Mangin et al. | |
| 6,765,909 B1 | 7/2004 | Sen et al. | |
| 6,785,726 B1 | 8/2004 | Freeman et al. | |
| 6,801,604 B2 | 10/2004 | Maes et al. | |
| 6,807,580 B2 | 10/2004 | Freeman et al. | |
| 6,807,581 B1 | 10/2004 | Starr et al. | |
| 6,816,456 B1 | 11/2004 | Tse-Au | |
| 6,820,133 B1 | 11/2004 | Grove et al. | |
| 6,836,795 B2 | 12/2004 | Soderberg et al. | |
| 6,854,009 B1 | 2/2005 | Hughes | |
| 6,879,526 B2 | 4/2005 | Lynch et al. | |
| 6,938,092 B2 | 8/2005 | Burns | |
| 6,941,386 B2 | 9/2005 | Craft et al. | |
| 6,944,555 B2 | 9/2005 | Blackett et al. | |
| 6,954,786 B1 | 10/2005 | Vered et al. | |
| 6,965,941 B2 | 11/2005 | Boucher et al. | |
| 6,975,647 B2 | 12/2005 | Neale et al. | |
| 6,990,531 B2 | 1/2006 | Vange | |
| 6,996,070 B2 | 2/2006 | Starr et al. | |
| 6,999,471 B1 | 2/2006 | Frazer et al. | |
| 7,020,719 B1 | 3/2006 | Grove et al. | |
| 7,028,183 B2 | 4/2006 | Simon et al. | |
| 7,042,898 B2 | 5/2006 | Blightman et al. | |
| 7,076,568 B2 | 7/2006 | Philbrick et al. | |
| 7,082,467 B2 | 7/2006 | Border et al. | |
| 7,085,247 B2 | 8/2006 | Schweinhart et al. | |
| 7,089,326 B2 | 8/2006 | Boucher et al. | |
| 7,093,099 B2 | 8/2006 | Bodas et al. | |
| 7,116,936 B2 | 10/2006 | Kim | |
| 7,120,666 B2 | 10/2006 | McCanne et al. | |
| 7,124,205 B2 | 10/2006 | Craft et al. | |
| 7,127,518 B2 | 10/2006 | Vange et al. | |
| 7,133,361 B2 | 11/2006 | Olariu et al. | |
| 7,133,940 B2 | 11/2006 | Blightman et al. | |
| 7,146,421 B2 | 12/2006 | Syvanne | |
| 7,164,661 B2 | 1/2007 | Kelly | |
| 7,167,926 B1 | 1/2007 | Boucher et al. | |
| 7,167,927 B2 | 1/2007 | Philbrick et al. | |
| 7,170,889 B2 | 1/2007 | Eagling et al. | |

(56) References Cited

U.S. PATENT DOCUMENTS

| | | |
|---|---|---|
| 7,174,393 B2 | 2/2007 | Boucher et al. |
| 7,185,266 B2 | 2/2007 | Blightman et al. |
| 7,191,241 B2 | 3/2007 | Boucher et al. |
| 7,191,318 B2 | 3/2007 | Tripathy et al. |
| 7,213,077 B2 | 5/2007 | Border |
| 7,219,158 B2 | 5/2007 | Border et al. |
| 7,237,036 B2 | 6/2007 | Boucher et al. |
| 7,245,405 B2 | 7/2007 | Friedman et al. |
| 7,245,696 B2 | 7/2007 | Yun et al. |
| 7,245,930 B1 | 7/2007 | Vishwanath et al. |
| 7,248,978 B2 | 7/2007 | Ransom |
| 7,254,606 B2 | 8/2007 | Hamada |
| 7,284,070 B2 | 10/2007 | Boucher et al. |
| 7,296,205 B2 | 11/2007 | Curcio et al. |
| 7,313,035 B2 | 12/2007 | Lynch et al. |
| 7,315,896 B2 | 1/2008 | Van Hensbergen et al. |
| 7,336,967 B2 | 2/2008 | Kelly et al. |
| 7,337,233 B2 | 2/2008 | Dillon |
| 7,337,241 B2 | 2/2008 | Boucher et al. |
| 7,359,985 B2 | 4/2008 | Grove et al. |
| 7,370,116 B2 | 5/2008 | Chan et al. |
| 7,386,310 B2 | 6/2008 | Dai et al. |
| 7,388,869 B2 | 6/2008 | Butehorn et al. |
| 7,389,330 B2 | 6/2008 | Dillon et al. |
| 7,389,533 B2 | 6/2008 | Bartlett et al. |
| 7,392,325 B2 | 6/2008 | Grove et al. |
| 7,398,552 B2 | 7/2008 | Pardee et al. |
| 7,418,518 B2 | 8/2008 | Grove et al. |
| 7,506,368 B1 | 3/2009 | Kersey et al. |
| 7,532,134 B2 | 5/2009 | Samuels et al. |
| 7,594,576 B2 | 9/2009 | Chen et al. |
| 7,596,373 B2 | 9/2009 | McGregor et al. |
| 7,660,887 B2 | 2/2010 | Reedy et al. |
| 7,817,063 B2 | 10/2010 | Hawkins et al. |
| 7,852,796 B2 | 12/2010 | Wang et al. |
| 7,885,260 B2 | 2/2011 | Tarachandani |
| 7,895,256 B2 | 2/2011 | Zombek et al. |
| 7,962,654 B2 | 6/2011 | Vange et al. |
| 7,975,066 B2 | 7/2011 | Vange et al. |
| 8,046,443 B2 | 10/2011 | Parker et al. |
| 8,051,017 B2 | 11/2011 | Munson et al. |
| 8,059,533 B2 | 11/2011 | Andreasen et al. |
| 8,195,823 B2 | 6/2012 | Thornton et al. |
| 8,265,052 B2 | 9/2012 | Abhishek et al. |
| 8,271,842 B2 | 9/2012 | Nagaraja |
| 8,306,528 B2 | 11/2012 | Malosh |
| 8,369,210 B2 | 2/2013 | Lei et al. |
| 8,370,435 B1 | 2/2013 | Bonefas et al. |
| 8,386,641 B2 | 2/2013 | Vange et al. |
| 8,418,233 B1 | 4/2013 | Hughes |
| 8,442,506 B2 | 5/2013 | Peacock |
| 8,463,912 B2 | 6/2013 | Bharadwaj |
| 8,533,308 B1 | 9/2013 | Rothstein |
| 8,543,665 B2 | 9/2013 | Ansari et al. |
| 8,631,474 B2 | 1/2014 | Brown et al. |
| 8,713,089 B2 | 4/2014 | Murphy et al. |
| 8,898,340 B2 | 11/2014 | Vange et al. |
| 8,977,711 B2 | 3/2015 | Vange et al. |
| 8,977,712 B2 | 3/2015 | Vange et al. |
| 2001/0010046 A1 | 7/2001 | Muyres et al. |
| 2001/0021949 A1 | 9/2001 | Blightman et al. |
| 2001/0023460 A1 | 9/2001 | Boucher et al. |
| 2001/0027496 A1 | 10/2001 | Boucher et al. |
| 2001/0043609 A1 | 11/2001 | Chapman et al. |
| 2001/0047433 A1 | 11/2001 | Boucher et al. |
| 2001/0056405 A1 | 12/2001 | Muyres et al. |
| 2002/0023145 A1 | 2/2002 | Orr et al. |
| 2002/0031131 A1 | 3/2002 | Yemini et al. |
| 2002/0087732 A1 | 7/2002 | Boucher et al. |
| 2002/0091844 A1 | 7/2002 | Craft et al. |
| 2002/0095519 A1 | 7/2002 | Philbrick et al. |
| 2002/0103881 A1 | 8/2002 | Granade et al. |
| 2002/0129159 A1 | 9/2002 | Luby et al. |
| 2002/0136240 A1 | 9/2002 | Counterman |
| 2002/0156927 A1 | 10/2002 | Boucher et al. |
| 2003/0031131 A1 | 2/2003 | Bottiglieri et al. |
| 2003/0055962 A1 | 3/2003 | Freund et al. |
| 2003/0079033 A1 | 4/2003 | Craft et al. |
| 2003/0093691 A1 | 5/2003 | Simon et al. |
| 2003/0140124 A1 | 7/2003 | Burns |
| 2003/0145106 A1 | 7/2003 | Brown |
| 2003/0147403 A1 | 8/2003 | Border et al. |
| 2003/0167346 A1 | 9/2003 | Craft et al. |
| 2003/0172264 A1 | 9/2003 | Dillon |
| 2003/0177395 A1 | 9/2003 | Pardee et al. |
| 2003/0177396 A1 | 9/2003 | Bartlett et al. |
| 2003/0200284 A1 | 10/2003 | Philbrick et al. |
| 2003/0219022 A1 | 11/2003 | Dillon et al. |
| 2004/0003126 A1 | 1/2004 | Boucher et al. |
| 2004/0006602 A1 | 1/2004 | Bess et al. |
| 2004/0010612 A1 | 1/2004 | Pandya |
| 2004/0054813 A1 | 3/2004 | Boucher et al. |
| 2004/0062246 A1 | 4/2004 | Boucher et al. |
| 2004/0064578 A1 | 4/2004 | Boucher et al. |
| 2004/0064589 A1 | 4/2004 | Boucher et al. |
| 2004/0064590 A1 | 4/2004 | Starr et al. |
| 2004/0073703 A1 | 4/2004 | Boucher et al. |
| 2004/0088262 A1 | 5/2004 | Boucher et al. |
| 2004/0109414 A1 | 6/2004 | Choi et al. |
| 2004/0109440 A1 | 6/2004 | Mattathil |
| 2004/0111461 A1 | 6/2004 | Claudatos et al. |
| 2004/0117509 A1 | 6/2004 | Craft et al. |
| 2004/0158793 A1 | 8/2004 | Blightman et al. |
| 2004/0240435 A1 | 12/2004 | Boucher et al. |
| 2005/0080873 A1 | 4/2005 | Joseph |
| 2005/0122986 A1 | 6/2005 | Starr et al. |
| 2005/0182841 A1 | 8/2005 | Sharp |
| 2005/0232220 A1 | 10/2005 | Evans |
| 2006/0010238 A1 | 1/2006 | Craft et al. |
| 2006/0129697 A1 | 6/2006 | Vange et al. |
| 2006/0159098 A1 | 7/2006 | Munson et al. |
| 2006/0168281 A1 | 7/2006 | Starr et al. |
| 2006/0200503 A1 | 9/2006 | Dosa et al. |
| 2007/0022185 A1 | 1/2007 | Hamilton et al. |
| 2007/0067437 A1* | 3/2007 | Sindambiwe ...... G06F 17/30899 709/224 |
| 2007/0110046 A1 | 5/2007 | Farrell et al. |
| 2007/0130356 A1 | 6/2007 | Boucher et al. |
| 2007/0186279 A1 | 8/2007 | Zimmer et al. |
| 2007/0223379 A1 | 9/2007 | Sivakumar et al. |
| 2007/0223481 A1 | 9/2007 | Sivakumar et al. |
| 2008/0022073 A1 | 1/2008 | Mittal et al. |
| 2008/0025230 A1* | 1/2008 | Patel ................... H04L 41/5022 370/252 |
| 2008/0040519 A1 | 2/2008 | Starr et al. |
| 2008/0062879 A1 | 3/2008 | Sivakumar et al. |
| 2008/0126553 A1 | 5/2008 | Boucher et al. |
| 2008/0151917 A1 | 6/2008 | Bartlett et al. |
| 2008/0238730 A1 | 10/2008 | Eroz et al. |
| 2009/0006920 A1 | 1/2009 | Munson et al. |
| 2009/0063698 A1 | 3/2009 | Xu et al. |
| 2009/0232049 A1 | 9/2009 | Singh et al. |
| 2009/0276261 A1 | 11/2009 | Chen |
| 2009/0276271 A1 | 11/2009 | Munson et al. |
| 2009/0300595 A1 | 12/2009 | Moran et al. |
| 2009/0313519 A1 | 12/2009 | Nagaraja |
| 2010/0011116 A1 | 1/2010 | Thornton et al. |
| 2010/0022878 A1 | 1/2010 | Azuma et al. |
| 2010/0217837 A1 | 8/2010 | Ansari et al. |
| 2010/0228878 A1 | 9/2010 | Xu et al. |
| 2011/0022707 A1 | 1/2011 | Bansal et al. |
| 2011/0087522 A1 | 4/2011 | Beaty et al. |
| 2011/0128972 A1 | 6/2011 | Thornton et al. |
| 2012/0047093 A1 | 2/2012 | Munson et al. |
| 2012/0054308 A1 | 3/2012 | Vange et al. |
| 2012/0059907 A1 | 3/2012 | Vange et al. |
| 2012/0272115 A1 | 10/2012 | Munson et al. |
| 2012/0290642 A1 | 11/2012 | Shaughnessy et al. |
| 2012/0297460 A1 | 11/2012 | Brown et al. |
| 2012/0320732 A1 | 12/2012 | Simu et al. |
| 2013/0019189 A1 | 1/2013 | Stewart et al. |
| 2013/0083805 A1 | 4/2013 | Lu et al. |

(56) References Cited

U.S. PATENT DOCUMENTS

| | | |
|---|---|---|
| 2013/0219468 A1 | 8/2013 | Bell |
| 2014/0105051 A1 | 4/2014 | Toner |

FOREIGN PATENT DOCUMENTS

| | | |
|---|---|---|
| EP | 0828214 | 3/1998 |
| EP | 0384339 | 8/1998 |
| EP | 0942363 | 9/1999 |
| EP | 1333642 | 8/2003 |
| EP | 1443713 | 8/2004 |
| EP | 1443730 | 8/2004 |
| EP | 1443731 | 8/2004 |
| EP | 1443732 | 8/2004 |
| GB | 2309558 | 7/1997 |
| WO | 97/29424 | 8/1997 |
| WO | 97/30392 | 8/1997 |
| WO | 98/26553 | 6/1998 |
| WO | 98/28938 | 7/1998 |
| WO | 99/09689 | 2/1999 |
| WO | 99/18534 | 4/1999 |
| WO | 99/57620 | 11/1999 |
| WO | 99/57637 | 11/1999 |
| WO | 03/104943 | 12/2003 |
| WO | 08/067597 | 6/2008 |

OTHER PUBLICATIONS

V. Kumar, "Beyond Best Effort: Router Architectures for the Differentiated Services of Tomorrow's Internet", May 1998, IEEE Communications Magazine, pp. 152-164.
R.M. Adler, "Distributed Coordination Models for Client/Server Computing", Apr. 1995, IEEE Computer, pp. 14-22.
G.C. Lai, et al., "Support QoS in IP over ATM", Computer Communications, 22 (1999) pp. 411-418.
3GPP, 3G TS 25.322 V3.2.0, Mar. 2000.
3GPP, 3G TS 25.323 V.3.0.0, Dec. 1999.
USPTO Office Action, dated Aug. 10, 2016 for U.S. Appl. No. 14/918,652, 4 pages.
USPTO Office Action, dated Apr. 13, 2016 for U.S. Appl. No. 14/672,425, 5 pages.
USPTO Office Action, dated Mar. 16, 2010 for U.S. Appl. No. 11/346,767, 7 pages.
USPTO Office Action, dated Sep. 8, 2009 for U.S. Appl. No. 11/346,767, 5 pages.
USPTO Office Action, dated Dec. 15, 2008 for U.S. Appl. No. 11/346,767, 5 pages.
USPTO Office Action, dated Sep. 28, 2011 for U.S. Appl. No. 12/584,938, 22 pages.
USPTO Office Action, dated Jan. 17, 2013 for U.S. Appl. No. 12/853,467, 6 pages.
USPTO Office Action, dated Oct. 9, 2012 for U.S. Appl. No. 12/853,467, 7 pages.
USPTO Office Action, dated Oct. 28, 2010 for U.S. Appl. No. 12/660,365, 7 pages.
USPTO Office Action, dated Jan. 29, 2014 for U.S. Appl. No. 13/023,460, 20 pages.
USPTO Office Action, dated May 5, 2015 for U.S. Appl. No. 13/023,460, 17 pages.
USPTO Office Action, dated Nov. 10, 2014 for U.S. Appl. No. 13/023,460, 21 pages.
USPTO Office Action, dated Jul. 18, 2012 for U.S. Appl. No. 13/156,120, 5 pages.
USPTO Office Action, dated Aug. 15, 2012 for U.S. Appl. No. 13/156,120, 5 pages.
USPTO Office Action, dated Mar. 26, 2014 for U.S. Appl. No. 13/288,636, 14 pages.
USPTO Office Action, dated Mar. 21, 2014 for U.S. Appl. No. 13/486,347, 9 pages.
USPTO Office Action, dated Apr. 7, 2014 for U.S. Appl. No. 13/288,670, 15 pages.
USPTO Office Action, dated Sep. 8, 2014 for U.S. Appl. No. 14/219,299, 7 pages.
USPTO Office Action, dated Mar. 3, 2016 for U.S. Appl. No. 13/964,447, 10 pages.
USPTO Office Action, dated Apr. 29, 2014 for U.S. Appl. No. 13/964,447, 4 pages.
USPTO Office Action, dated Sep. 2, 2016 for U.S. Appl. No. 13/964,447, 9 pages.
USPTO Office Action, dated Oct. 22, 2015 for U.S. Appl. No. 13/964,447, 11 pages.
USPTO Office Action, dated Nov. 17, 2014 for U.S. Appl. No. 13/964,447, 8 pages.
USPTO Office Action, dated Jun. 17, 2015 for U.S. Appl. No. 14/079,856, 6 pages.
USPTO Office Action, dated Jun. 23, 2015 for U.S. Appl. No. 14/158,255, 10 pages.
USPTO Office Action, dated Sep. 26, 2014 for U.S. Appl. No. 14/158,255, 23 pages.
USPTO Office Action, dated Nov. 30, 2016 for U.S. Appl. No. 14/934,507, 5 pages.
USPTO Office Action, dated May 3, 2017 for U.S. Appl. No. 15/435,281, 7 pages.

* cited by examiner

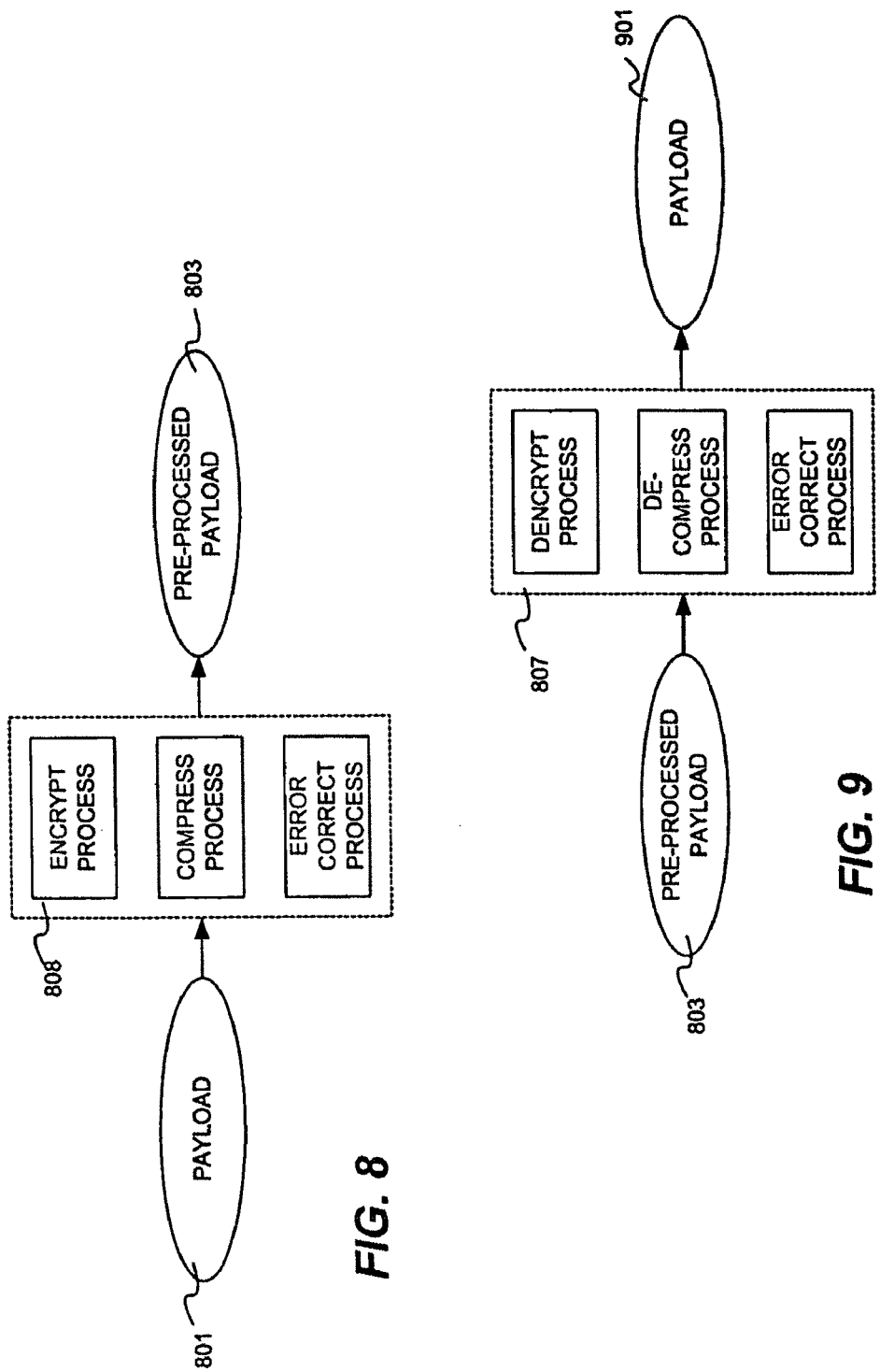

SYSTEM AND DEVICES FACILITATING DYNAMIC NETWORK LINK ACCELERATION

CROSS REFERENCE TO RELATED APPLICATIONS

This application is a continuation of U.S. application Ser. No. 14/918,652, filed Oct. 21, 2015, which is a continuation of U.S. patent application Ser. No. 14/158,255, filed Jan. 17, 2014, which is a continuation of U.S. patent application Ser. No. 13/023,460, filed Feb. 28, 2011, which is a continuation-in-part of U.S. patent application Ser. No. 12/584,938, filed Sep. 14, 2009, now U.S. Pat. No. 8,195,823, issued Jun. 5, 2012, which is a continuation-in-part of U.S. patent application Ser. No. 11/346,767, filed Feb. 3, 2006, now U.S. Pat. No. 7,975,066, issued Jul. 5, 2011, which is a divisional of U.S. patent application Ser. No. 09/835,876, filed Apr. 16, 2001, now U.S. Pat. No. 7,127,518, which claims priority to U.S. Provisional Patent Application No. 60/197,490, filed Apr. 17, 2000. The present application claims priority to each of said applications and incorporates by reference each of said applications as if set forth fully herein.

FIELD OF THE INVENTION

The present invention relates, in general, to network performance and, more particularly, to software, systems and methods for implementing dynamic network acceleration functionality within a network infrastructure.

BACKGROUND OF THE INVENTION

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce, broadcast and multicast messaging, videoconferencing, gaming, and the like.

The Internet is a collection of disparate computers and networks coupled together by a web of interconnections using standardized communications protocols. The Internet is characterized by its vast reach as a result of its wide and increasing availability and easy access protocols. Unfortunately, the heterogeneous nature of the Internet makes it difficult for the hardware and software that implement the Internet to add functionality.

The Open System Interconnection (OSI) network model usefully describes networked data communication, such as the Internet, as a series of logical layers or protocol layers. Each layer provides services to the layer above it, and shields the layer above it from details of lower layers. Each layer is configured to communicate with other similar level layers. In general, computers at network nodes (e.g., clients and servers) implement higher level processes including application layer, presentation layer, and session layer processes. Lower level processes, including network layer, data link layer and physical layer operate to place data in a form suitable for communication across a raw communication channel or physical link. Between the higher and lower level processes is a transport layer that typically executes on a machine at the network node, but is highly dependent on the lower level processes.

While standards exist for these layers, application designers have a high level of control and can implement semantics and functionality at the higher layers with a great deal of latitude. In contrast, lower layers are highly standardized. Implementing or modifying functionality in a lower layer protocol is very difficult as such changes can affect almost all users of the network. Devices such as routers that are typically associated with infrastructure operate exclusively at the lower protocol layers making it difficult or impossible to implement functionality such as real-time processing, data compression, encryption and error correction within a network infrastructure.

Although the term "Internet infrastructure" encompasses a variety of hardware and software mechanisms, the term primarily refers to routers, router software, and physical links between these routers that function to transport data packets from one network node to another.

Internet infrastructure components such as routers and switches are, by design, asynchronous. Also by design, it is difficult to accurately predict or control the route a particular packet will take through the Internet. This architecture is intended to make the Internet more robust in the event of failures, and to reduce the cost, complexity and management concerns associated with infrastructure components. As a result, however, a particular node or machine cannot predict the capabilities of the downstream mechanisms that it must rely on to deliver a packet to its destination. A sending node cannot expect all mechanisms in the infrastructure to support the functions and/or syntax necessary to implement such functions as real time processing, data compression, encryption, and error correction.

For example, it is difficult if not impossible to conduct synchronous or time-aware operations over the Internet. Such operations include, for example, real-time media delivery, access to financial markets, interactive events, and the like. While each IP packet includes information about the time it was sent, the time base is not synchronous between sender and receiver, making the time indication inaccurate. Packets are buffered at various locations through the Internet infrastructure, and there is no accurate way to ascertain the actual age or time of issue of the packet. Hence, critical packets may arrive too late.

Data compression is a well-known technique to improve the efficiency of data transport over a communication link. Typically, data compression is performed at nodes sending the data and decompression performed at a node receiving the data. Infrastructure components responsible for sending the information between the sending and receiving processes do not analyze whether effective compression has been performed, nor can the infrastructure implement compression on its own. Where either the sending or receiving process is incapable of effective compression, the data goes uncompressed. This creates undesirable burden that affects all users. While modems connecting a user over a phone line often apply compression to that link, there is no analogous function within the Internet infrastructure itself. A need exists for Internet infrastructure components that compress data between network nodes to improve transport within the Internet.

Similarly, encryption and other data security techniques are well known techniques to ensure only authorized users can read data. Like compression, however, encryption is typically performed by user-level and application-level processes. If either sending or receiving process cannot perform compatible encryption, the data must be sent in the clear or by non-network processes. A need exists for Internet infrastructure components that apply encryption or other security processes transparently to users.

As another example, forward error correction (FEC) is a known technique to reduced traffic volume, reduce latency, and/or increase data transfer speed over lossy connections. FEC adds redundant information, also referred to as error correction code, to the original message, allowing the receiver to retrieve the message even if it contains erroneous bits. FEC coding can enhances decoded bit error rate values three order of magnitude relative to systems not implementing any FEC techniques. When the error can be detected and corrected at the receiving end, there is less need to resend data. FEC is extensively used in many digital communication systems at some level and in mass storage technology to compensate for media and storage system errors.

However, FEC is not used within the Internet infrastructure. This stems in part from the additional complexity, cost and management tasks that such capability would impose on the system hardware and software. FEC requires that the sender and receiver both implement compatible FEC processes. Hence, most if not all infrastructure components would have to be replaced or modified to implement FEC in an effective manner. Efforts to implement FEC between sending and receiving nodes are outlined in IETF RFC 2733. This proposed standard applies to real time transport protocol (RTP) communications between a client and server. This FEC method affects endpoints to a data transfer, but does not affect servers and or other infrastructure components located between the endpoints. Hence, a need exists for systems and methods that implement FEC within the Internet infrastructure to offer the benefits of FEC technology seamlessly to network users.

In most cases these types of functionality are implemented in higher level processes (e.g., the OSI application layer, presentation layer, session layer and/or transport layer). However this requires that sending and receiving nodes implement a common syntax. For example, both sending and receiving nodes must implement complementary encryption/decryption processes, however once this is ensured, the communication will be encrypted through out transport. In practice there are multiple standards for real-time processing, encryption, compression, and error correction, and one or the other node may be unable to support the protocols of the other nodes. Hence, it is desirable to implement such functionality is a manner that is independent of the higher level processes so that otherwise incompatible or incapable application-level processes can benefit.

In other cases, for example real time processing and error correction, it is desirable to have the functionality implemented within the network infrastructure, not only between the nodes. For example, implementing error correction only between the sending and receiving nodes is only a partial solution, as the infrastructure components that operate at lower network layers (e.g., transport, network, data link and/or physical layer) cannot read error correction codes inserted at higher network layers. As another example, traffic prioritization within the network benefits from knowledge of when packets were actually sent so that they can be delivered in time for real-time processes.

A particular need exists in environments that involve multiple users accessing a network resource such as a web server. Web servers are typically implemented with rich functionality and are often extensible in that the functionality provided can be increased modularly to provide general-purpose and special-purpose functions. Examples include information services, broadcast, multicast and videoconference services, as well as most electronic commerce (e-commerce) applications. In these applications it is important that functionality provided by network-connected resources be provided in a dependable, timely and efficient manner.

Many e-commerce transactions are abandoned by the user because system performance degradations frustrate the purchaser before the transaction is consummated. While a transaction that is abandoned while a customer is merely browsing through a catalog may be tolerable, abandonment when the customer is just a few clicks away from a purchase is highly undesirable. However, existing Internet transport protocols and systems do not allow the e-commerce site owner any ability to distinguish between the "just browsing" and the "about to buy" customers as this information is represented at higher network layers that are not recognized by the infrastructure components. In fact, the vagaries of the Internet may lead to the casual browser receiving a higher quality of service while the about-to-buy customer becomes frustrated and abandons the transaction.

SUMMARY OF THE INVENTION

A peer to peer dynamic network acceleration method and apparatus are disclosed herein. Peer to peer dynamic network acceleration provides an enhanced link between two client devices. It is noted that a client disclosed herein may also or alternatively connect to servers and other computing devices directly through an enhanced link. Traditionally, these devices communicate via a standard protocol or link. The enhanced link allows data traffic to be accelerated (among other things) directly to/from the clients. A standard client may be enhanced with a front-end and/or back-end mechanism to establish and communicate across the enhanced link. The front-end and back-end may translate between a standard protocol, such as one used by an application, and an enhanced protocol. In this manner, the application need not be modified to take advantage of the enhanced link.

A peer to peer dynamic network acceleration apparatus may have various embodiments. For example, in one embodiment, an enhanced client computing device may be provided. The enhanced client computing device may comprise one or more processors configured to process one or more data packets of a first protocol, at least one front-end, and at least one back-end. The first protocol may be a standard protocol.

The front-end may be configured to receive the data packets of the first protocol from the processors, and to encode the data packets of the first protocol to generate one or more data packets of a second protocol. The front-end may be configured to request establishment of an enhanced link from a remote back-end prior to encoding the data packets of the first type to generate one or more data packets of a second protocol.

The back-end may be configured to receive one or more incoming data packets of the generated by a remote front-end from one or more original data packets, and to decode the incoming data packets to restore the original data packets. The incoming data packets may be of the second protocol and the original data packets may be of the first protocol. The back-end may be configured to receive a request to establish an enhanced link from the remote front-end prior to decoding the incoming data packets to restore the original data packets.

The front-end and the back-end may implement preselected compatible semantics to encode and decode data packets of the first and second protocols. At least one network interface configured to communicate a plurality of data packets of the second protocol between the enhanced client computing device and one or more remote client computing devices may be provided as well. The front-end may be configured to transmit one or more discovery messages via the network interface and to receive responses thereto to automatically discover remote back-ends. Likewise, the back-end may be configured to respond to one or more discovery messages from the remote front-end via the network interface.

It is contemplated that the front-end may be configured to receive one or more encoded data packets generated by a remote back-end from one or more original data packets at the remote back-end, and to decode the encoded data packets to restore the original data packets. The encoded data packets being of the second protocol and the original data packets being of the first protocol.

In another exemplary embodiment, a peer to peer network acceleration system may be provided. The peer to peer network acceleration system may comprise at least one first client computing device having one or more first applications configured to communicate via a standard protocol. The first client computing device may comprise a front-end configured to encode the first data packets according to an enhanced protocol, and to restore one or more original data packets from one or more encoded data packets, the first data packets and the original data packets being of the standard protocol. It is noted that the front-end may be configured to intercept data packets only from the first applications for encoding.

The front-end may be configured to transmit one or more discovery messages and receive responses thereto to detect the back-end of the second client computing device. The front-end may automatically establish the enhanced link with the back-end upon detecting the back-end by communicating at least one of the encoded data packets to the back-end.

At least one second client computing device may be included in the system. The second client computing device may have one or more second applications that communicate via the standard protocol. The second client computing device may comprise a back-end configured to restore one or more first original data packets from the encoded data packets, and to encode one or more second data packets according to the enhanced protocol, the first original data packets and the second data packets being of the standard protocol. The back-end may be configured to respond to one or more discovery messages to identify the back-end to the front-end.

The first applications and the second applications may be collaboration software stored on a tangible medium, such as project collaboration software, groupware, instant messaging software, video conferencing software, and audio conferencing software.

The system may also include at least one enhanced link between the first client computing device and the second client computing device. The enhanced link may comprise the encoded data packets and the second data packets after they have been encoded. It is noted that the first client computing device may be configured to send a request to establish the enhanced link to the second client computing device. In addition or alternatively, the second client computing device may be configured to respond to a request to establish the enhanced link from the first computing device.

Various methods for transferring data between client devices are also disclosed herein. In one exemplary embodiment, the method for transferring data between client devices comprises running a first client application on a first client device (the client application configured to generate and receive one or more first data packets of a standard protocol), encoding the first data packets according to an enhanced protocol to generate one or more first encoded data packets for transfer to a second client application on a second client device, and receiving one or more second encoded data packets of the enhanced protocol (the second encoded data packets comprising data from one or more original data packets). It is contemplated that or more discovery messages may be sent to detect the second client device. It is also contemplated that only the first data packets from the first application may be encoded to generate the first encoded data packets. The original data packets may be restored from the second encoded data packets, and the original data packets may be passed to the first client application.

It is noted that various hardware add-ons or software may be used to facilitate the enhanced data transfer. For example, a communication interface of a hardware add-on may be connected to the first client device, and the first encoded data packets may be transferred to the second client application via a network interface of the hardware add-on. Alternatively or in addition, machine readable code may be downloaded and stored on a tangible medium accessible to the first client device. The encoding of the first packets may then occur by executing the machine readable code.

Further objects, features, and advantages of the present invention over the prior art will become apparent from the detailed description of the drawings which follows, when considered with the attached figures.

DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 illustrates exemplary pre-processing processes;

FIG. 9 illustrates exemplary post-processing processes;

DETAILED DESCRIPTION OF THE INVENTION

Figure 1:
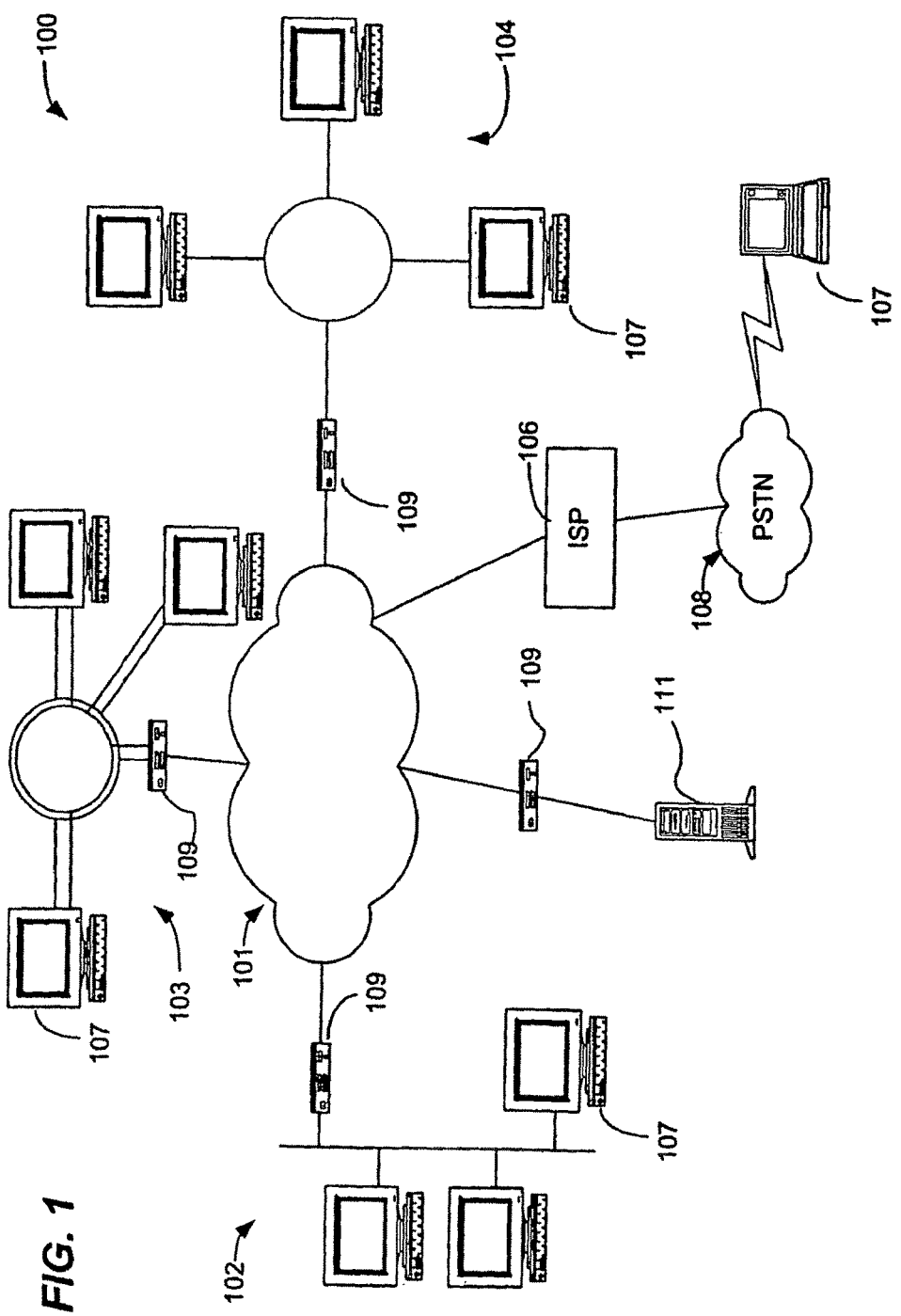
FIG. 1 illustrates a general distributed computing environment in which the present invention is implemented.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A first set of inventions relate to the improved functionality and metrics available when cooperating front-end and back-end mechanisms, such as servers or other network devices, are used to transport data through the public network. This first class of inventions enable an enhanced link in which both ends can be synchronized and so easily know when the other end performed specific operations such as datagram generation and transmission. This enables each side to take actions based on the knowledge that was previously only available to the transmitting side. Other functionality includes compression of traffic between front-end and back-end mechanisms using public or proprietary data compression that can be readily selected and optimized for the particular content data currently being transported. Similarly, encryption/decryption can be employed between the front-end and back-end mechanisms for enhanced security without impacting either a web server or a web client that are principles of the transaction. Forward error correction can be used to reduce the quantity of traffic, improve latency, and/or increase speed of the transport between front-end and back-end components.

A second set of inventions relates to performance and functionality improvements enabled by implementing the front-end and back-end mechanisms as dynamically re-configurable elements. This second class of inventions enables multiple front-ends to connect with and service multiple back-ends and/or one or more web servers or web sites. These inventions also include the ability for one front-end to service multiple back-ends and by extension multiple web servers or web sites. Similarly, one front-end can service multiple web servers or content providers directly.

In one aspect, the present invention involves a system for multiplexing data from a plurality of links or channels onto a shared bandwidth channel. The plurality of links may be fixed-bandwidth links, or may themselves be shared bandwidth links. The plurality of links may comprise a homogenous user-level protocol, such as HTTP, or may comprise a variety of user level protocols such as HTTP, FTP, NNTP, SMTP and the like. The plurality of links may similarly comprise homogenous network-layer and/or physical layer protocols, or may comprise a varied set of network-layer and physical layer protocols.

The shared bandwidth channel allows a variety of services to be provided. Some advantages are achieved simply by multiplexing multiple links onto a single channel. This combination enables the single channel to be persistent thereby avoiding overhead associated with setting up, maintaining and breaking down connections that would otherwise be required of each the multiple links. The single shared channel can also include more information than the protocols of the plurality of links allow such as time synchronization information and quality of service information.

In a particular embodiment, the shared bandwidth channel transports packets that are composed by selecting data from the plurality of links in an order and rate determined to provide differential levels of service between packets. The differential service levels may mean that some of the data are transported with lower latency and/or higher quality of service than other data. The criteria for providing differential levels of service are not limited, but in particular embodiments are based on content type, user identity, user history, and session statistics.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional LAN systems.

The present invention is particularly useful in applications where there is a large amount of data communicated between web servers and web clients (i.e., browser software) or where timeliness (e.g., low latency transport) is important. For example, real-time stock quotes, multi-player games, multi-tiered service to ASP (application service provider) software distribution models benefit from the improvements provided by the present invention. Although the present invention will be described in terms of particular applications, these examples are provided to enhance understanding and are not a limitation of the essential teachings of the present invention.

For purposes of this document, a web server is a computer running server software coupled to the World Wide Web (i.e., "the web") that delivers or serves web pages. The web server may have a unique IP address and be configured to accept connections in order to service requests by sending back responses. A web server differs from a proxy server or a gateway server in that a web server has resident a set of resources (i.e., software programs, data storage capacity, and/or hardware) that enable it to execute programs to provide an extensible range of functionality such as generating web pages, accessing remote network resources, analyzing contents of packets, reformatting request/response traffic and the like using the resident resources. In contrast, a proxy simply forwards request/response traffic on behalf of a client to resources that reside elsewhere, or obtains resources from a local cache if implemented. A web server in accordance with the present invention may reference external resources of the same or different type as the services requested by a user, and reformat and augment what is provided by the external resources in its response to the user. Commercially available web server software includes Microsoft Internet Information Server (IIS), Netscape Netsite, Apache, among others. Alternatively, a web site may be implemented with custom or semi-custom software that supports HTTP traffic.

Though described herein with reference to a web server, it is contemplated that various servers may utilize the systems and methods described herein. For example, email, database, file and other data servers may use an enhanced link to communicate their respective data to other server, clients, or other computing devices.

FIG. 1 shows an exemplary computing environment 100 in which the present invention may be implemented. Environment 100 includes a plurality of local networks such as Ethernet network 102, FDDI network 103 and Token Ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example UNIX, Novell, or Windows NT networks, or peer-to-peer type network. Each network will include distributed storage implemented in each device and typically includes some mass storage device coupled to or managed by a server computer. Network 101 comprises, for example, a public network such as the Internet or another network mechanism such as a fiber channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101.

Network appliances 107 may also couple to network 101 through public switched telephone network 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as UNIX variants, Microsoft Windows, Macintosh OS, and the like. At the same time, some appliances 107 comprise portable or handheld devices using wireless connections through a wireless access provider such as personal digital assistants and cell phones executing operating system software such as PalmOS, WindowsCE, EPOCOS, and the like. Moreover, the present invention is readily extended to network devices such as office equipment, vehicles, and personal communicators that make occasional connection through network 101.

Each of the devices shown in FIG. 1 may include memory, mass storage, and a degree of data processing capability (e.g. one or more processors) sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
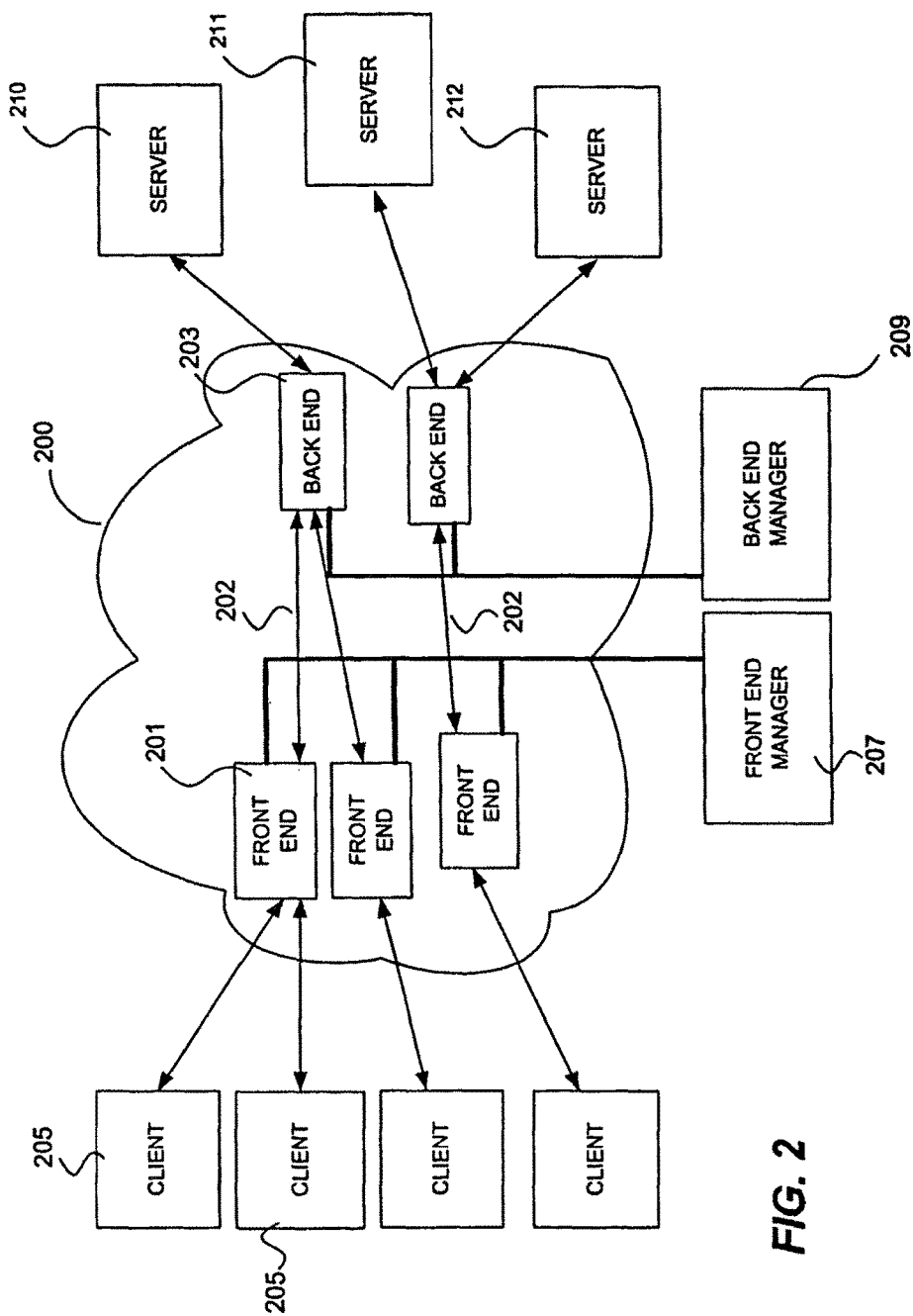
FIG. 2 illustrates in block-diagram form entity relationships in a system in accordance with the present invention.

The present invention operates in a manner akin to a private network 200 implemented within the Internet infrastructure as shown in FIG. 2. Private network 200 enhances communications between a client 205 and a web site 210 by implementing any of a variety of processes that enhance efficiency and/or functionality independently of client 205 and/or server 210. These processes include time synchronization processes, quality of service management processes, compression processes, security processes, and error correction processes.

In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications for file transfer protocol (FTP) services, voice over Internet protocol (VoIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via a wireless application protocol or the like.

For convenience, the term "web site" is used interchangeably with "web server" in the description herein although it should be understood that a web site comprises a collection of content, programs and processes implemented on one or more web servers. A web site is owned by the content provider such as an e-commerce vendor whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The present invention adds two components to the infrastructure: a front-end 201 and back-end 203. Front-end 201 and back-end 203 are coupled by an enhanced link 202 that forms, in essence, a private network.

Front-end mechanism 201 serves as an access point for client-side communications. In the process of translating a requested domain name into an IP address of a particular server hosting the requested domain name, mechanisms described in reference to FIG. 3 operate to select a particular front-end mechanism 201. In effect, the domain is dynamically assigned to the selected front-end mechanism. More than one front-end 201 may host a single domain. So long as a client 205 associates the domain name with the IP address of the selected front-end 201, all client requests to the domain will be routed to the selected front-end 201.

Front-end mechanism 201 implements a set of processes in the dynamically assigned domain that implement a gateway that functions as a substitute for the web server(s) implementing web site 210 (i.e., from the perspective of client 205, front-end 201 appears to be the web site 210). Front-end 201 comprises, for example, a computer that sits "close" to clients 205. By "close", it is meant that the average latency associated with a connection between a client 205 and a front-end 201 is less than the average latency associated with a connection between a client 205 and a web site 210. Desirably, front-end computers have as fast a connection as possible to the clients 205. For example, the fastest available connection may be implemented in a point of presence (POP) of an Internet service provider (ISP) 106 used by a particular client 205. However, the placement of the front-ends 201 can limit the number of browsers that can use them. Because of this, in some applications it is more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

The enhanced link 202 is implemented by cooperative actions of the front-end 201 and back-end 203. The back-end 203 processes and directs data communication to and from web site 210. In preferred embodiments, the enhanced link 202 communicates data packets using a secondary or enhanced communication protocol. The secondary or enhanced protocol may be a proprietary or non-standard protocol (e.g., a protocol distinct from that ordinarily used by a network or computing device) that provides advantages, such as security, increased efficiency, improved transfer rates, etc . . . , as compared to standard protocols, such as TCP. Though various enhanced protocols may be used, the enhanced protocol is generally referred to herein as the transport morphing Protocol™ (Trademark of Circadence Corporation) or TMP™ (Trademark of Circadence Corporation) because TMP exemplifies elements and advantages desirable in an enhanced protocol. TMP is implemented over the public Internet infrastructure in the particular example. Hence, the present invention does not require heavy infrastructure investments and automatically benefits from improvements implemented in the general purpose network 101. Unlike the general purpose Internet, front-end 201 and back-end 203 are programmably assigned to serve accesses to a particular web site 210 at any given time.

It is contemplated that any number of front-end and back-end mechanisms may be implemented cooperatively to support the desired level of service required by the web site owner. The present invention implements a many-to-many mapping of front-ends to back-ends. Because the front-end to back-end mappings can be dynamically changed, a fixed hardware infrastructure can be logically reconfigured to map more or fewer front-ends to more or fewer back-ends and web sites or servers as needed.

Front-end 201 together with back-end 203 function to reduce traffic across the enhanced link 202 and to improve response time for selected browsers. Traffic across the enhanced link 202 is reduced, for example, by compressing data. Compression can be implemented using any available compression mechanism and may operate on a packet-by-packet level or by assembling data from multiple packets to compress across a larger data set. Although compression may be applied equally to all data, it is known that some types of data do not benefit from compression. It is also known that certain compression mechanisms and algorithms are better suited for particular types of data. Accordingly, the present invention contemplates the dynamic selection of a compression mechanism based on the type of data being processed. For example, HTML data, which makes up a large proportion of web-based traffic, typically includes ASCII text which is known to compress well using, for example, compressed HTML mechanisms. Encrypted data, however, often does not compress well. Accordingly, the present invention may be implemented to apply compressed HTML techniques to HTML packets while passing encrypted packets (e.g., packets using a secure HTTP scheme) without attempting encryption. So long as front-end 201 and back-end 203 share a common semantic for performing the compression/decompression processes, any available algorithm may be implemented.

Encryption processes are largely analogous to compression processes in that they may be implemented by a number of available cipher algorithms and mechanisms including stream ciphers and block ciphers providing various levels of data security. It usually is not valuable to encrypt data that is already encrypted, hence it is contemplated that encryption may be selectively applied. Moreover, a vast majority of data transferred in many applications does not require encryption at all. The particular encryption mechanism used by the front-end 201 and back-end 203 can be selected based upon the type of data, or designated on a file-by-file basis by a manager of server 210, for example. Front-end 201 and back-end 203 must share a common encryption/decryption semantic, however.

In one embodiment, front-end 201 and back-end 203 share operational information such as time synchronization and quality of service metrics with each other. This information is readily communicated by specially designated packets transmitted on enhanced link 202, and/or by including the information in one or more enhanced packets, such as TMP packets, that are used to exchange this operational information. Traffic across enhanced link 202 is preferably managed by selectively transmitting packets at a rate determined to provide adequate quality of service and suitable packet delivery time using this knowledge shared between the front-end 201 and back-end 203. Optionally, this operational information can be shared with processes running on client 205 and/or server 210 as well, although such sharing would require special configuration of client 205 and/or server 210 and is not required to achieve the benefits of the present invention.

Traffic may be further reduced by using forward error correction (FEC) techniques to compensate for lossy connections. A variety of FEC techniques are known that add various amounts of overhead to the traffic. The selection of a particular method depends on the quality of service (i.e., transit times and packet loss rate and/or bit error rate) of the communication channel being used. In one implementation, a statically defined FEC mechanism can be implemented between front-end 201 and back-end 203 based on average or worst-case quality of service (QoS). However, because both front-end 201 and back-end 203 have knowledge of the QoS metrics of each other and are time synchronized, it is contemplated that the FEC mechanisms can be adaptive to current QoS metrics. For example, a data packets may be encoded with a 1-bit/byte error correction code during times of high QoS, and dynamically changed to a 3-bit/byte or 4-bit/byte error correction (or higher) encoding when QoS degrades. So long as front-end 201 and back-end 203 share a common semantic for handling the FEC processes, the actual implementation of those processes is very flexible and can be dynamically defined.

The blending of request datagrams results in fewer request:acknowledge pairs across the enhanced link 202 as compared to the number required to send the packets individually between front-end 201 and back-end 203. This action reduces the overhead associated with transporting a given amount of data, although conventional request:acknowledge traffic is still performed on the links coupling the front-end 201 to client 205 and back-end 203 to a web server. Moreover, resend traffic is significantly reduced further reducing the traffic. Response time is further improved for select privileged users and for specially marked resources by determining the priority for each HTTP transmission.

In one embodiment, front-end 201 and back-end 203 are closely coupled to the Internet backbone. This means they have high bandwidth connections, can expect fewer hops, and have more predictable packet transit time than could be expected from a general-purpose connection. Although it is preferable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or web servers 210. Such an implementation reduces the number of hops required to reach a front-end 201 while increasing the number of hops within the enhanced link 202 thereby yielding control over more of the transport path to the management mechanisms of the present invention.

Clients 205 no longer conduct all data transactions directly with the web server 210. Instead, clients 205 conduct some and preferably a majority of transactions with front-ends 201, which simulate the functions of web server 210. Client data is then sent, using enhanced link 202, to the back-end 203 and then to the web server 210. Running multiple clients 205 over one large connection provides several advantages:

- Since all client data is mixed, each client can be assigned a priority. Higher priority clients, or clients requesting higher priority data, can be given preferential access to network resources so they receive access to the channel sooner while ensuring low-priority clients receive sufficient service to meet their needs.
- The large connection between a front-end 201 and back-end 203 can be permanently maintained, shortening the many TCP/IP connection sequences normally required for many clients connecting and disconnecting.
- Services such as encryption, compression, error correction and time synchronization that may not be available or efficiently implemented in particular clients 205 can be practically implemented in enhanced link where the resources required to provide these services are shared across multiple clients 205.

Using a proprietary protocol allows the use of more effective techniques to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-ends 201 may be implemented or assigned to particular web sites. Each front-end 201 is dynamically re-configurable by updating address parameters to serve particular web sites. Client traffic is dynamically directed to available front-ends 201 to provide load balancing. Hence, when quality of service drops because of a large number of client accesses, an additional front-end 201 can be assigned to the web site and subsequent client requests directed to the newly assigned front-end 201 to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of web servers 210 to which they are currently assigned. Other administrative and configuration information stored in front-end 201 may include information for prioritizing data from and to particular clients, quality of service information, and the like.

Similarly, additional back-ends 203 can be assigned to a web site to handle increased traffic. Back-end manager component 209 couples to one or more back-ends 203 to provide centralized administration and configuration service. Back-ends 203 include data structures to hold current configuration state, quality of service information and the like. In the particular examples a front-end manager 207 and a back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites. These and similar modifications are equivalent to the specific examples illustrated herein.

In the case of web-based environments, front-end 201 is implemented using custom or off-the-shelf web server software. Front-end 201 is readily extended to support other, non-web-based protocols, however, and may support multiple protocols for varieties of client traffic. Front-end 201 processes the data traffic it receives, regardless of the protocol of that traffic, to a form suitable for transport by enhanced link 202 to a back-end 203. Hence, most of the functionality implemented by front-end 201 is independent of the protocol or format of the data received from a client 205. Hence, although the discussion of the exemplary embodiments herein relates primarily to front-end 201 implemented as a web server, it should be noted that, unless specified to the contrary, web-based traffic management and protocols are merely examples and not a limitation of the present invention.

As shown in FIG. 2, in accordance with the present invention a web site is implemented using an originating web server 210 operating cooperatively with the web server of front-end 201. More generally, any network service (e.g., FTP, VoIP, NNTP, MIME, SMTP, Telnet, DBMS) can be implemented using a combination of an originating server working cooperatively with a front-end 201 configured to provide a suitable interface (e.g., FTP, VoIP, NNTP, MIME, SMTP, Telnet, DBMS, WAP) for the desired service. In contrast to a simple front-end cache or proxy software, implementing a server in front-end 201 enables portions of the web site (or other network service) to actually be implemented in and served from both locations. The actual web pages or service being delivered comprises a composite of the portions generated at each server. Significantly, however, the web server in front-end 201 is close to the browser in a client 205 whereas the originating web server is close to all resources available at the web hosting center at which web site 210 is implemented. In essence the web site 210 is implemented by a tiered set of web servers comprising a front-end server 201 standing in front of an originating web server.

This difference enables the web site or other network service to be implemented so as to take advantage of the unique topological position each entity has with respect to the client 205. By way of a particular example, consider an environment in which the front-end server 201 is located at the location of an ISP used by a particular set of clients 205 and back-end 203 is closely coupled by a private channel to server 210. In such an environment, clients 205 can access the front-end server 205 without actually traversing the network 101, hence the need for encryption and error correction and time synchronization services are relaxed with respect to the client-to-front-end link. In such cases the services provided transparently by enhanced link 202 are substantially a complete substitute for prior services implemented by modifying client 205 and server 210 themselves.

Figure 3:
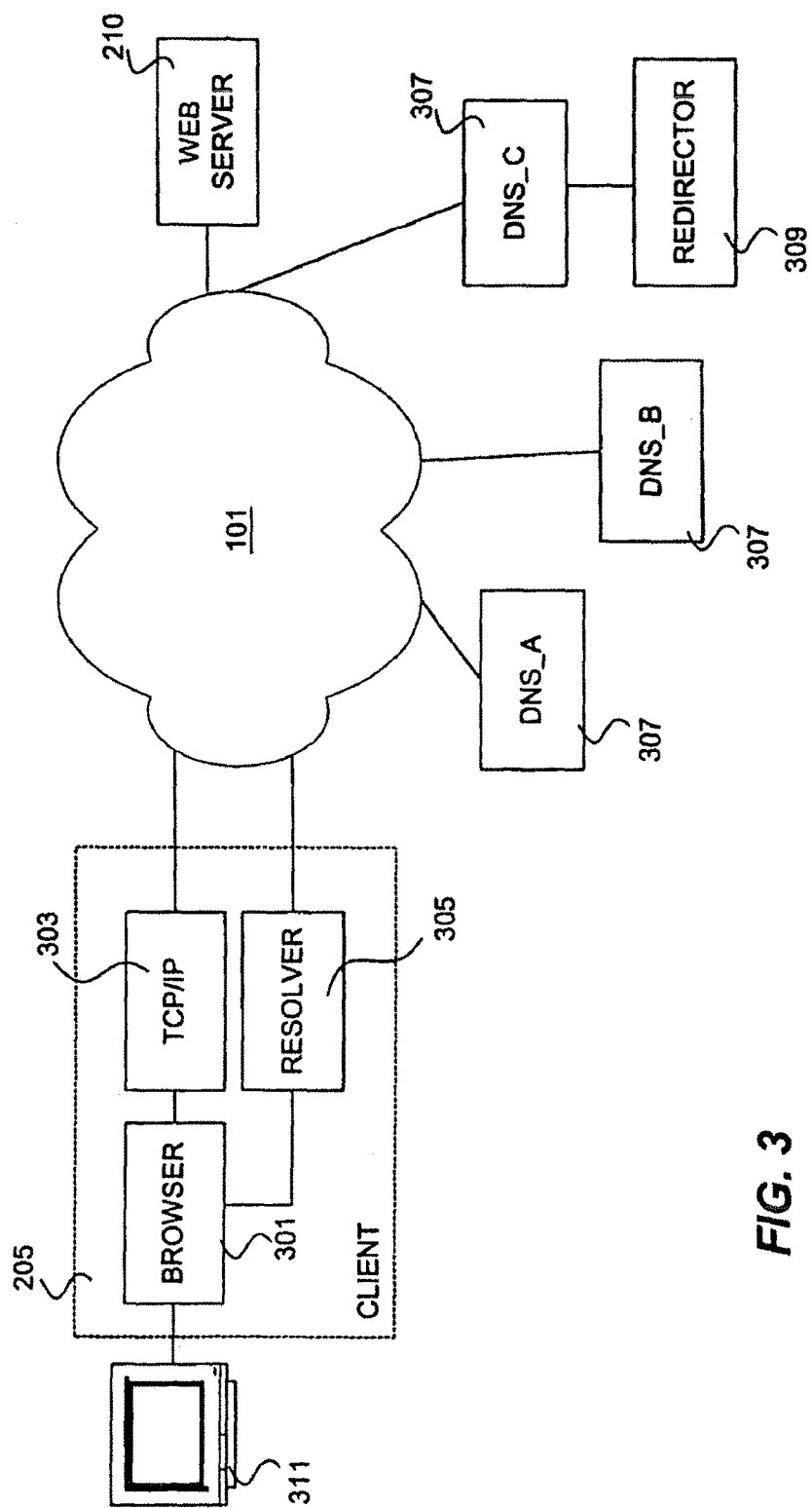
FIG. 3 illustrates a domain name system used in an implementation of the present invention.

In order for a client 205 to obtain service from a front-end 201, it must first be directed to a front-end 201 that can provide the desired service. Preferably, client 205 does not need to be aware of the location of front-end 201, and initiates all transactions as if it were contacting the originating server 210. FIG. 3 illustrates a domain name server (DNS) redirection mechanism that illustrates how a client 205 is connected to a front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general-purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point. IP protocol requires that each data packet include, among other things, an IP address identifying a destination node. In current implementations the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.circadence.com), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to the best available front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 may identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate back-end 203.

Figure 4:
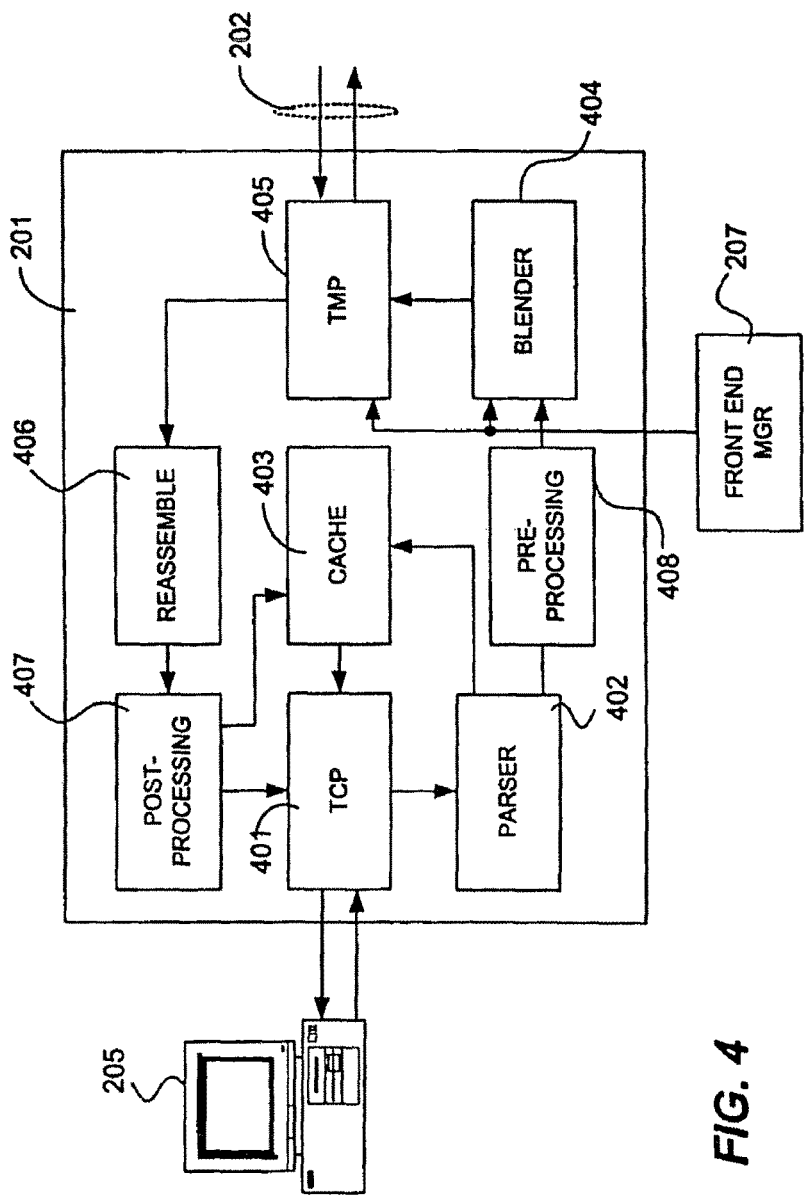
FIG. 4 illustrates front-end components of FIG. 2 in greater detail.

FIG. 4 illustrates principle functional components of an exemplary front-end 201 in greater detail. Primary functions of the front-end 201 include translating standard packets, such as transmission control protocol (TCP) packets from client 205 into enhanced packets used in the system in accordance with the present invention. It is contemplated that various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP), structured query language (SQL) and the like. Any user-level protocol, including proprietary protocols, may be implemented within the present invention using appropriate modification of parser 402.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 404 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

In accordance with the present invention, front-end 201 implements security processes, compression processes, encryption processes, error correction processes and the like to condition the received data for improved transport performance and/or provide additional functionality. These processes may be implemented within pre-processing unit 408, or alternatively implemented within any of the functional components within front-end 201. Also, front-end 201 may implement a prioritization program to identify packets that should be given higher priority service. A prioritization program requires only that front-end 201 include a data structure associating particular clients 205 or particular TCP packet types or contents with a prioritization value. Based on the prioritization value, parser 402 may selectively implement such features as caching, encryption, security, compression, error correction and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into a more desirable "TMP data units" that are sized for transport through the enhanced link 202. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 217 that enables selection of a preferable TMP packet size. Alternatively, a fixed TMP packet size can be set that yields desirable performance across enhanced link 202. Data blender 404 also marks the TMP data units so that they can be reassembled at the receiving end. Data blender 404 may also serve as a buffer for storing packets from all appliances 107 that are associated with front-end 201. In accordance with the present invention, data blender 404 may associate a prioritization value with each packet.

The enhanced link utilizes a TMP protocol, described in greater detail hereinbelow, to communicate TMP packets. Received TMP packets include subpackets from multiple TCP connections. The data portions of subpackets are reassembled by reassemble mechanism 406 into a form suitable for return to the requesting client 205. For example, in an HTTP environment reassemble mechanism 406 creates HTTP response payloads akin to what would have been generated by an origin server 210.

Postprocessing mechanism 407 performs decompression, decryption, forward error correction and the like on packets received from a back-end 203. As described hereinafter with respect to FIG. 5, back-end 203 preferably includes pre-processing mechanisms 508 that are analogous to pre-processing mechanisms 408. Hence, post-processing mechanisms 407 restore the data to a form usable by a client 205 without additional processing. Accordingly, client 205 need not implement any of the pre-processing or post processing functions while still realizing the benefits of these processes.

Figure 5:
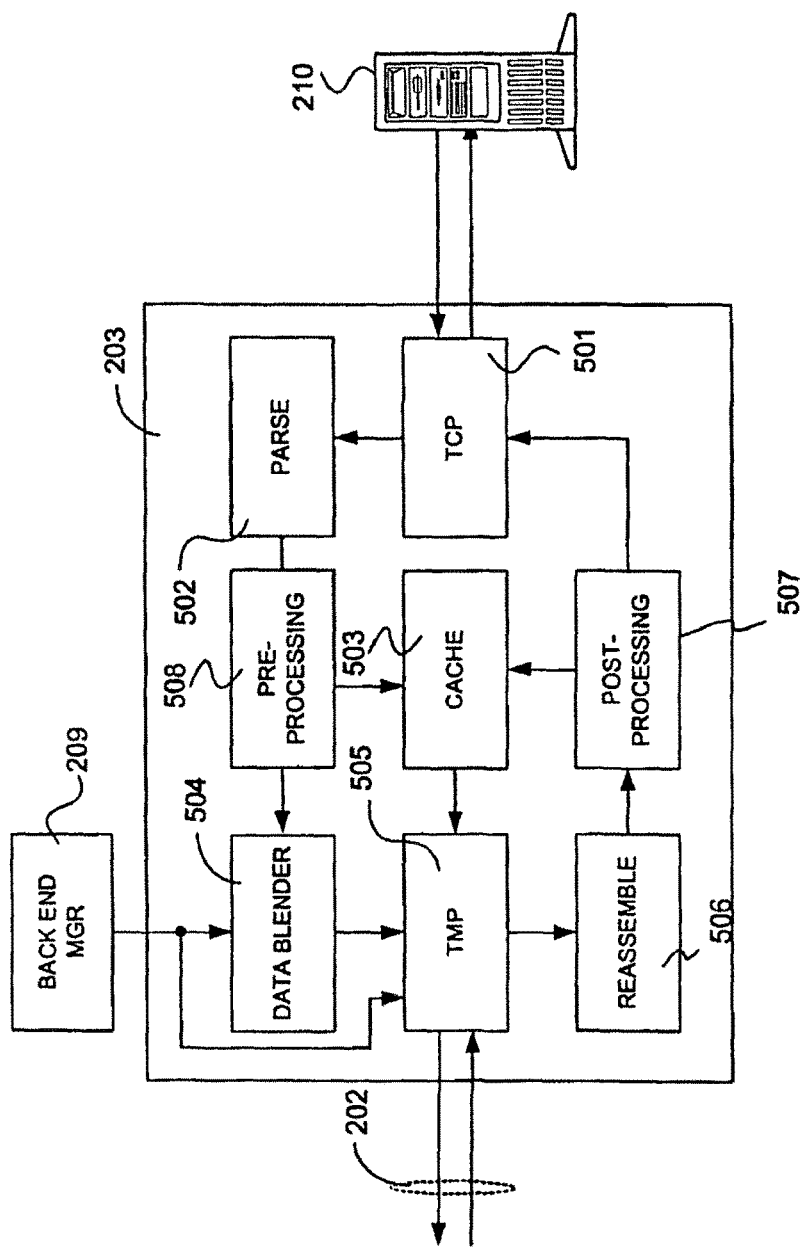
FIG. 5 illustrates back-end components of FIG. 2 in greater detail.

FIG. 5 illustrates principle functional components of an exemplary back-end 203 in greater detail. Primary functions of the back-end 203 include translating transmission control protocol (TCP) packets from web server 210 into TMP packets as well as translating TMP packets received from a front-end 201 into the one or more corresponding TCP packets to be send to server 210. Further, back-end 203 is able to implement similar or complementary functionality to that of front-end 203. In this manner, back-end 203 can operate as a web server to retrieve content and generate web pages, analyze and reformat web pages and components within web pages, and similar server functionality that would conventionally be implemented in a server 210. In general, any functionality and behavior described herein that can be implemented on server 210 and/or front-end server 201 can also be implemented on back-end server 203.

TMP unit 505 receives TMP packets from enhanced link 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 5 to extract the data portion from the received TCP packets. Pre-processing mechanism 508 and post-processing mechanism 507 operate in an analogous fashion to components 407 and 408 to perform compression, encryption, error correction, and the like, and forward those packets to data blender 504. Data blender 504 operates in a manner akin to data blender 404 shown in FIG. 5 to buffer and prioritize packets in a manner that is efficient for TMP transfer. Priority information is received by, for example, back-end manager 209 based upon criteria established by the web site owner. TMP data is streamed into TMP unit 505 for communication on enhanced link 202.

Figure 6:
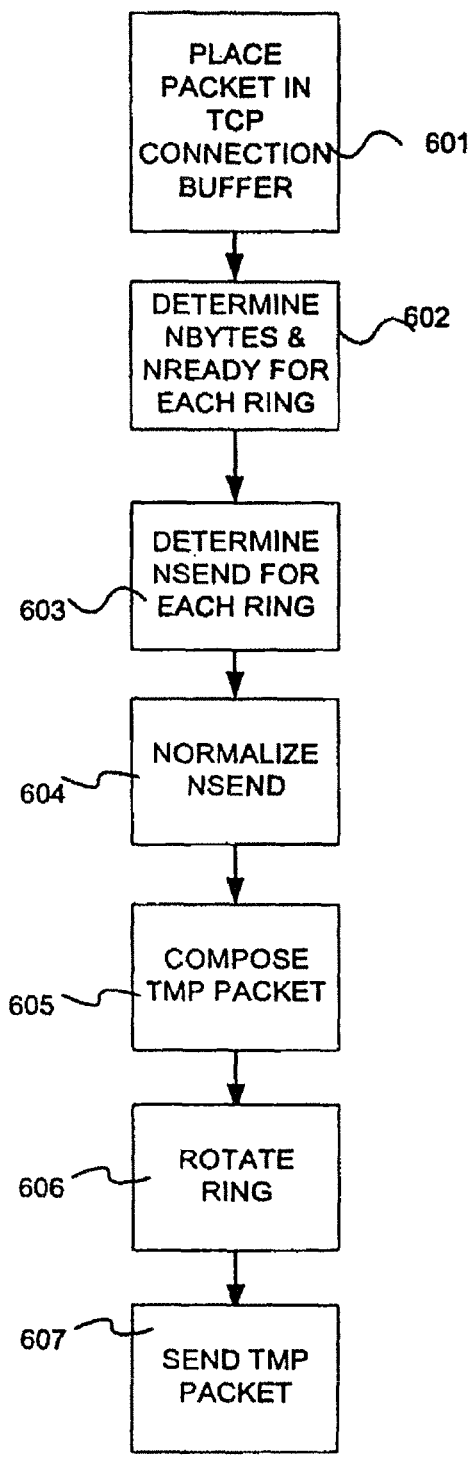
FIG. 6 illustrates in flow-diagram form processes involved in an exemplary implementation of the present invention.
Figure 7:
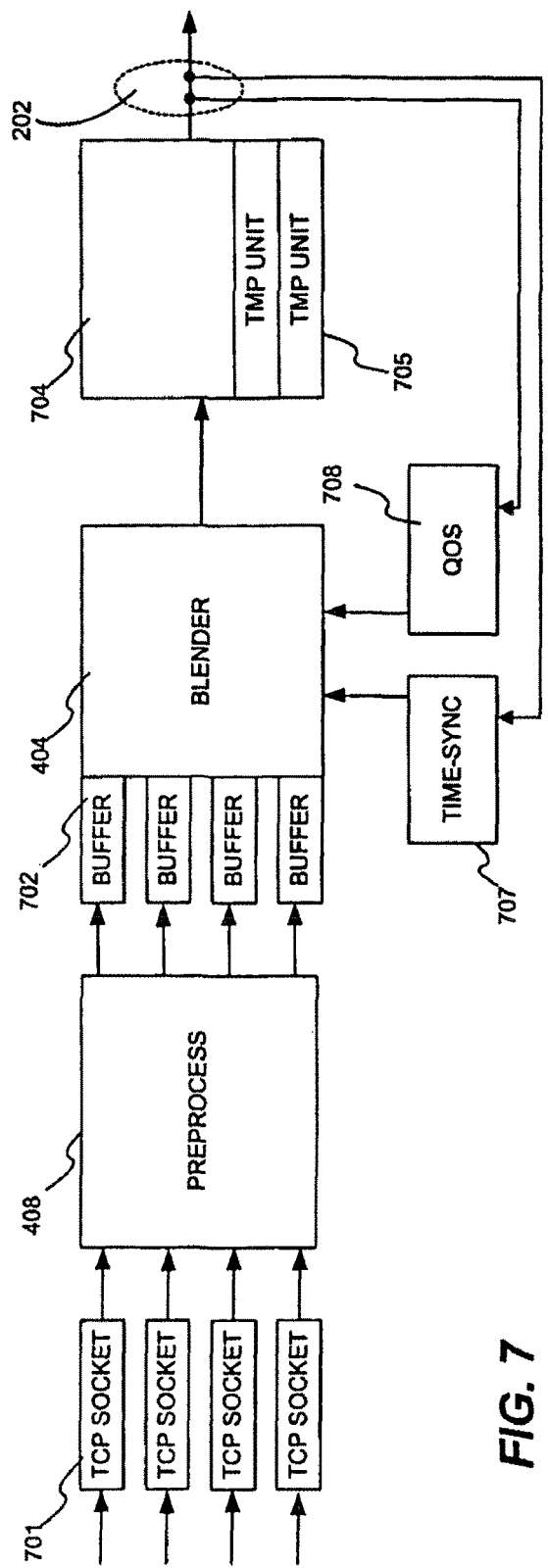
FIG. 7 illustrates a conceptual block diagram of particular components introduced in FIG. 2 in greater detail.

In an exemplary implementation, illustrated in FIG. 6 and FIG. 7, a "TMP connection" comprises a plurality of "TCP connection buffers", logically arranged in multiple "rings". Each TCP socket 701 maintained between the front-end 201 and a client 205 corresponds to a TCP connection buffer 702. Pre-processing 408 is performed on the TCP connection buffer data to provide, for example, data compression, encryption, and/or error correction coding before the data is placed in the corresponding TCP connection buffer 702.

When a TCP connection buffer 702 is created, it is assigned a priority. For purposes of the present invention, any algorithm or criteria may be used to assign a priority. Each priority ring is associated with a number of TCP connection buffers having similar priority. In a specific example, five priority levels are defined corresponding to five priority rings. Each priority ring is characterized by the number of connection buffers it holds (nSockets), the number of connection buffers it holds that have data waiting to be sent (nReady) and the total number of bytes of data in all the connection buffers that it holds (nBytes).

A TCP connection buffer 702 is created and placing one or more preprocessed packets from a TCP socket 701 within the TCP connection buffer 702. A TCP connection buffer 702 is sized to hold a plurality of TCP packets and each TCP connection buffer 702 is associated with a priority value. The priority value is assigned when TCP connection buffer 702 is first created and may be dynamically changed in operation.

When sending data, blender 404 performs a series of processes outlined in FIG. 6 that access data from the TCP connection buffers 702 to form TMP data units 705 that are transmitted. The processes performed by blender 404 include:

In step 602, determine the number of bytes available to be sent from each ring (nBytes), and the number of TCP connections that are ready to send (nReady)

In step 603, determine how many bytes should be sent from each ring. This is based on a weight parameter for each priority. The weight can be thought of as the number of bytes that should be sent at each priority this time through the loop.

The nSend value computed in the previous step 603 reflects the weighted proportion that each ring will have in a blended TMP packet, but the values of nSend do not reflect how many bytes need to be selected to actually empty most or all of the data waiting to be sent a single round. To do this, the nSend value is normalized to the ring having the most data waiting (e.g., nBytes=nSendNorm) in step 604. This involves a calculation of a factor: S=nBytes/(Weight*nReady) for the ring with the greatest nReady. Then, for each ring, calculate nReady*S*Weight to get the normalized value (nSendNorm) for each priority ring.

In step 605, sub-packets are sent from the different rings. This is done, for example, by taking a sub-packet from the highest priority ring and adding it to a TMP packet, then adding a sub-packet from each of the top two queues, then the top three, and so on. A variety of algorithms may be used to select particular sub-packets from the different rings to implement a desired level of fairness, prioritization, and quality of service.

Referring to step 606, within each ring, sub-packets are added round robin. When a sub-packet is added from a TCP connection buffer the ring is rotated so the next sub-packet the ring adds will come from a different TCP connection buffer. Each sub-packet can be up to 512 bytes in a particular example. If the connection buffer has less than 512 bytes waiting, the data available is added to the TMP packet.

In step 607, when a full TMP packet (roughly 1.5 kB in a particular example) is built, it is sent. This can have three or more sub packets, depending on their size. The TMP packet will also be sent when there is no more data ready.

TMP unit 405 (shown in FIG. 4) and TMP unit 505 (shown in FIG. 5) implement the TMP protocol that communicates packets between front-end 201 and back-end 203. The protocol is rides on top of universal datagram protocol (UDP) in that network devices that handle TMP packets treat them as UDP packets. However, TMP packets differ from standard UDP packets in that they have additional unique header data defining a unique set of messages, outlined below, to support the TMP functionality. Also, the manner in which TMP packets are transferred onto the physical communication channel, referred to as the protocol behavior, differs significantly from TCP.

TMP packets have a header that contains packet control information. Some TMP packets also carry extra information in a data or payload portion. The packet control information includes, for example:

A connection number (that identifies the connection to which it belongs)

A checksum for data integrity

A set of flags (which may be used or remain unused) for a variety of purposes

A message type identifier

The confirmed message type

The rest of the packet header contains information or data which can differ between packets, depending on the message type.

A short list of messages that can be sent by the TMP protocol includes: data, acknowledgments, connection requests and replies, time synchronization requests and replies, resent data, control messages, QoS messages, status requests and replies, suspend messages, and alerts. Packet header content which is specific to the message type is as follows.

Acknowledgment
- The last sequential confirmed sequence message
- The confirmed message sequence number Time Synchronization Request
- Requester time index Time Synchronization Reply
- The time that the request was received
- The time that the reply was sent
- Requester time index Connection Request
- The connections index (zero for a new connection)
- Requested receiving port
- An additional set of flags (which may be used or unused) for a variety of purposes Connection Reply
- The replier's base time
- A time offset from the point of receiving the request in milliseconds
- The connections index (zero for a new connection)
- An additional set of flags (which may be used or unused) for a variety of purposes Data
- Data sequence number
- Time that the message was sent The rest of the packet comprises the packet body or payload portion. Alert and Acknowledge packets do not have bodies. All other packets contain bodies that carry additional information appropriate to the message itself (for example, a data packet will send the data itself).

It is important to note that alerts and QoS information are built into the protocol and do not need to be passed as data packets. Since these types of information are not built into TCP they would need to be sent as data, which might affect the application using the protocol. This means that the receiving end needs to process the packet only once to draw out the information it requires. In contrast, when QoS information is sent as a data packet in TCP, the receiving end has to process the packet as a data packet simply to get to the information that allows the alert or QoS information to be processed, which means that TCP must double the amount of processing for alerts and QoS information.

Of particular interest in the present invention, the exchange of time synchronization information 707 enables front-end 201 and back-end 203 to have a common time base and ascertain the time of issue of any received packet. While the current implementation does not include base time or time index data in the header of data packets, this information can readily be included in all message types, a subset of message types, and/or in a special message type defined for real-time data transport. In this manner, the recipient of a TMP packet knows with a high level of certainty when a received packet was transmitted, something that existing Internet protocols do not provide. In the case of TMP packets from a back-end 203 to a front-end 201, the information can be used by the front-end 201 as a factor in ordering responses to clients 205. In the case of TMP packets from a back-end 203 to a front-end 201, the information can be used by the front-end 203 as a factor in ordering responses to clients 205.

Rather than synchronizing clocks the front-end 201 and back-end 203 (i.e., absolute time synchronization), the time synchronization information 707 may indicate a differential between the clocks of the two machines (i.e., relative time synchronization). Relative time synchronization can be used substantially equivalently to information that would allow actual synchronization of the clocks. Accordingly, "time synchronization" and "time synchronized" refer inclusively to both absolute and relative time synchronization methods.

The time synchronization information 707 augments or replaces the "time to live" feature of conventional IP packets. Each IP packet specifies a time to live value that must be decremented by each router or device that handles the packet. As the time value can only be incremented in one-second units, the value becomes a hop count rather than an actual timing function. When a packet's time to live value is decremented to zero, it is discarded and must be retransmitted. In accordance with the present invention, the time to live value for TMP packets can be used more meaningfully as the recipient knows when the packet was actually sent and can set or reset the time to live value to a meaningful value when the packet leaves a front-end 201 or back-end 203.

As in all protocols, the messages in TMP have an order in which they are sent as well as particular defined situations in which they are sent. A typical TMP session might begin with a connection request. For reference, the end point that sends the connection request will be referred to as the front-end, and the receiver of the request will be referred to as the back-end, although the TMP protocol operates bi-directionally between front-ends and back-ends. The front-end 201 sends a connection request to the back-end 203, and the back-end 203 sends a connection reply back to the front-end 201. This reply will be either positive (connection accepted), or negative (connection refused). If the reply is positive, then the connection is established and the front-end and back-end can begin to exchange data.

TMP is a TCP-like protocol adapted to improve performance for multiple connections operating over a single pipe. The enhanced link in accordance with the present invention provides a stable connection between two processes for high-speed, reliable, adaptable communication. TMP is not merely a substitute for the standard TCP environment. TMP is designed to perform particularly well in heterogeneous network environments such as the Internet. TMP connections are made less often than TCP connections. Once a TMP connection is made, it remains up unless there is some kind of direct intervention by an administrator or there is some form of connection-breaking network error. This reduces overhead associated with setting up, maintaining and tearing down connections normally associated with TCP.

Another feature of TMP is its ability to channel numerous TCP connections through a single enhanced link 202. The environment in which TMP resides allows multiple TCP connections to occur at one end of the system. These TCP connections are then mapped to a single TMP connection. The TMP connection is then broken down at the other end of the enhanced link 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a enhanced link 202. As often happens in a network environment, each end has a great deal of information about the characteristics of the connection in one direction, but not the other. QoS information 708 is exchanged between front-end 201 and back-end 203 in accordance with the present invention. By knowing about the connection as a whole, TMP can better take advantage of the available bandwidth.

A QoS message is sent alone or may be piggybacked on a data packet. It sends information regarding the connection from one end of the connection to the other. Both front-end 201 and back-end 203 send QoS messages. The information in a QoS message is the most up to date that the sending end has. That means that if a QoS message is to be resent, the QoS information is updated before it is resent. A QoS message is identified by the message type flag QoS. In a particular implementation, a QoS message contains:

- 16 Bits—Average round trip time (RTT). This indicates the average round trip time as calculated by this end of the system over the last time interval, measured in milliseconds.
- 32 Bits—Packets Sent. This indicates the number of packets that were sent in the last time interval.
- 32 Bits—Packets Received. This indicates the number of packets that were received in the last time interval.
- 32 Bits—Packets Resent. This indicates the number of packets that needed to be resent in the last time interval.
- 16 Bits—Window Size. This value indicates the current window size that one end is operating under. This will allow for a random sampling of window sizes to be gathered at the other end.
- 16 Bits—Packets in Flight. This value indicates the current number of packets that one end has sent to the other end without receiving an acknowledgement. This will allow for a random sampling of packets in flight to be gathered by the other end.
- 32 Bits—Time Interval. The span of time that the information in the QOS packet is dealing with. This parameter is measured in seconds.

In this manner, both front-end 201 and back-end 203 are aware of not only their own QoS metrics, but also those of the machine with which they are communicating and their shared communication link.

As suggested in FIG. 7, QoS information 708 and time synchronization information 707 can be used by blender 404 to select the order in which data is placed into TMP data units 705. Also, QoS information 708 can be used by TMP units 405 and 505 to alter the TMP behavior.

In contrast with conventional TCP mechanisms, the behavior implemented by TMP unit 405 is constantly changing. Because TMP obtains bandwidth to host a variable number of TCP connections and because TMP is responsive to information about the variable status of the network, the behavior of TMP is preferably continuously variable. One of the primary functions of TMP is being able to act as a conduit for multiple TCP connections. As such, a single TMP connection cannot behave in the same manner as a single TCP connection. For example, imagine that a TMP connection is carrying 100 TCP connections. At this time, it loses one packet. TCP would require that the connection bandwidth be cut in half. This is a performance reduction on 100 connections instead of just on the one that lost the packet.

Each TCP connection that is passed through the TMP connection must get a fair share of the bandwidth, and should not be easily squeezed out by competing users of the available bandwidth. To allow this to happen, every TMP connection becomes more aggressive in claiming bandwidth as it accelerates Like TCP, the bandwidth available to a particular TMP connection is measured by its window size (i.e., the number of outstanding TCP packets that have not yet been acknowledged). Bandwidth is increased by increasing the window size, and relinquished by reducing the window size. Up to protocol specified limits, each time a packet is successfully delivered and acknowledged, the window size is increased until the window size reaches a protocol specified maximum. When a packet is dropped (e.g., no acknowledge received or a resend packet response is received), the bandwidth is decreased by backing off the window size. TMP also ensures that it becomes more and more resistant to backing off (as compared to TCP) with each new TCP connection that it hosts. Further, a TMP should not go down to a window size of less than the number of TCP connections that it is hosting.

In a particular implementation, every time a TCP connection is added to (or removed from) what is being passed through the TMP connection, the TMP connection behavior is altered. It is this adaptation that ensures successful connections using TMP. Through the use of the adaptive algorithms discussed above, TMP is able to adapt the amount of bandwidth that it uses. When a new TCP connection is added to the TMP connection, the TMP connection becomes more aggressive to accommodate it. When a TCP connection is removed from the TMP connection, the TMP connection becomes less aggressive.

The enhanced link 202 provides improved performance in its environment as compared to conventional TCP channels, but it is recognized that enhanced link 202 resides on the Internet in the preferred implementations. Hence, TMP must live together with many protocols and share the pipe efficiently in order to allow the other protocols fair access to the shared communication bandwidth. Since TMP takes only the amount of bandwidth that is appropriate for the number of TCP connections that it is hosting (and since it monitors the connection and controls the number of packets that it puts on the line), TMP will exist cooperatively with TCP traffic. Furthermore, since TMP does a better job at connection monitoring than TCP, TMP is better suited to throughput and bandwidth management than TCP.

FIG. 8 illustrates an exemplary set of processes 808 implemented by pre-processing units 408 and 508. Some, none, or all processes illustrated in FIG. 8 may be implemented on particular packets as described hereinbefore. Unprocessed payload 801 from a payload portion of a packet are passed to processes 808 that perform encryption, compression, and/or error correction. The actual algorithms used to implement encryption, compression and/or error correction in any specific implementation are a design choice made be to meet the needs of a particular application. Error correction is preferably forward error correction that adds redundant data to the pre-processed payload so that a recipient can reconstruct the payload portion in the presence of one or more transmission errors. The amount and format of redundant information can be varied dynamically to account for current QoS conditions as reported by, for example, QoS information 708.

FIG. 9 illustrates an exemplary set of processes implemented by post-processing units 407 and 507. Some, none, or all processes illustrated in FIG. 9 may be implemented on particular packets depending on the corresponding pre-processing performed on the packets. Pre-processed packets are passed to processes that perform decryption, decompression, and/or error correction decoding. The actual algorithms used in any specific implementation are determined to complement the pre-processing processes. Error correction operates to detect one or more transmission errors, determine if the detected errors are correctable, and when correctable, reforming the corrected payload. Payload portion 903 is essentially a fully-formed payload portion of, for example, an HTTP packet.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols and languages including FTP, NNTP, SMTP, SQL and the like. In such implementations the front-end 201 and/or back-end 203 are modified to implement the desired protocol. Moreover, front-end 201 and back-end 203 may support different protocols and languages such that the front-end 201 supports, for example, HTTP traffic with a client and the back-end supports a DBMS protocol such as SQL. Such implementations not only provide the advantages of the present invention, but also enable a client to access a rich set of network resources with minimal client software.

An additional aspect of the invention is the creation and use of one or more clients enhanced with the functionality of a front-end mechanism, back-end mechanism, or both. These clients are referred to herein as enhanced clients. In one or more embodiments, these clients may incorporate, implement, or include a front-end and/or back-end mechanism implemented by the software, hardware, or both of the enhanced client. For example, as will be described further below, a client such as described above may be enhanced by including software, hardware, or both which allows the client to include the functionality of a front-end mechanism. Typically, but not always, a client may be enhanced by software alone. For example, machine readable code configured to provide front-end and/or back-end functionality when executed by an enhanced client may be provided. The machine readable code may be fixed on a tangible medium, such as a hard drive, memory, or other storage device, accessible to an enhanced client.

In this way, a enhanced link may be implemented by cooperative actions between a plurality of enhanced clients, or between one or more enhanced clients and one or more (stand alone) back-ends, front-ends or both. Enhanced clients may create an enhanced link dynamically. For instance, the enhanced link may be created and used only when communicating with particular services on a corporate or other LAN. In this way, the enhanced clients provide network link acceleration by taking advantage of the enhanced link and TMP protocol as described herein. The link acceleration is dynamic in that it may be used when desired or required and not used otherwise. It is noted that the benefits described herein (including accelerated communication) of the enhanced link and TMP protocol be used dynamically by an enhanced client.

Figure 10:
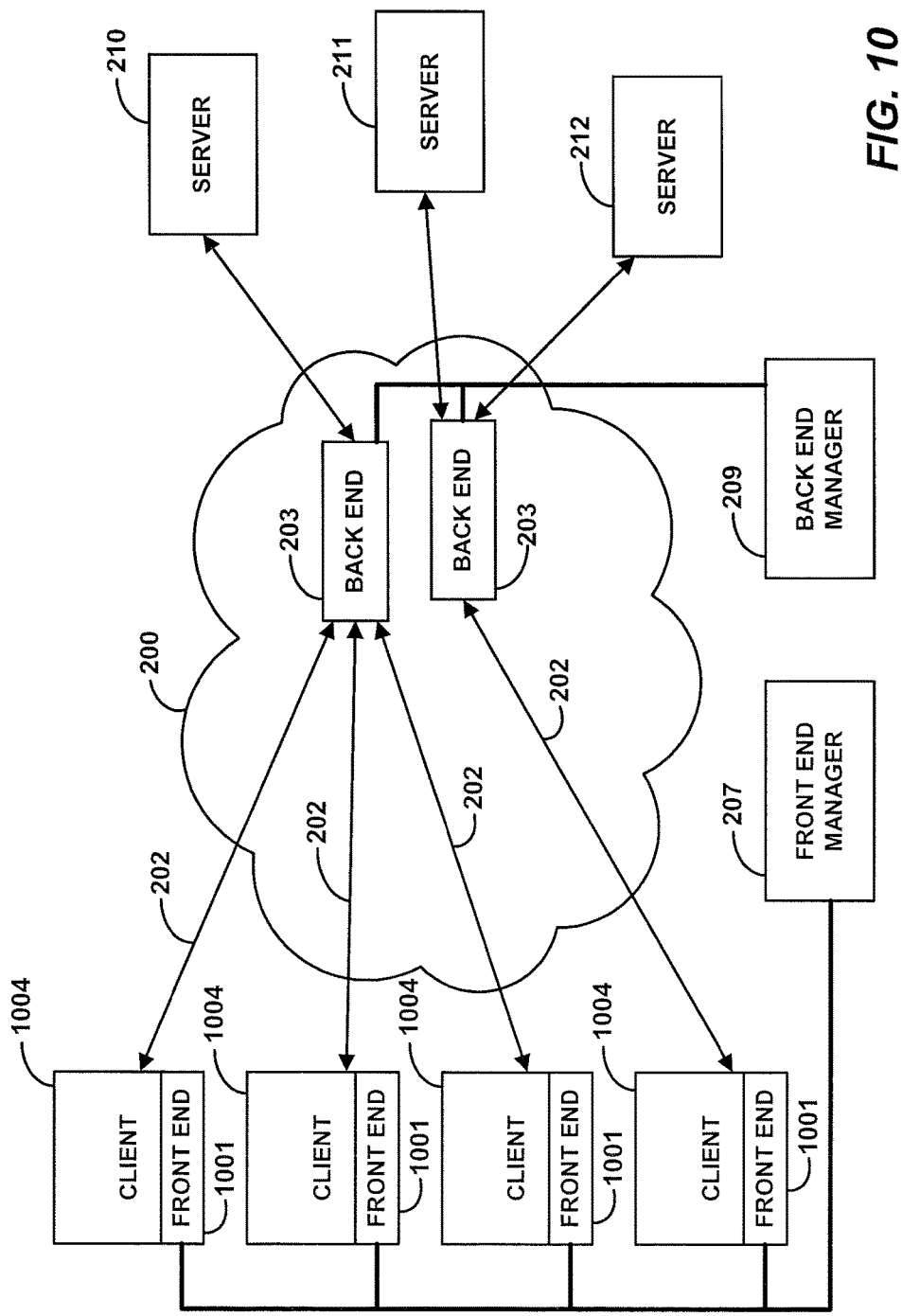
FIG. 10 illustrates a general distributed computing environment in which the present invention is implemented.

FIG. 10 illustrates an exemplary network infrastructure having one or more enhanced clients 1004. As can be seen, the enhanced clients 1004 shown include an internal front-end mechanism 1001 which allows a enhanced link 202 to be implemented between the enhanced clients and one or more back-ends 203. In this manner, the benefits of the enhanced link 202 as described above may be utilized directly by clients.

As can be seen, a front end manager 207 may communicate with an internal front-end 1001 of the enhanced clients 1004 to provide administrative and configuration information to front-ends 201. In this manner, the administration and configuration of the enhanced clients 1004 may be performed similar to that of stand alone front-ends, such as those described above with regard to FIG. 2. In fact it is contemplated that a front end manager 207 may provide administrative and configuration information to enhanced clients 1004 and stand alone front-end mechanisms.

Figure 11:
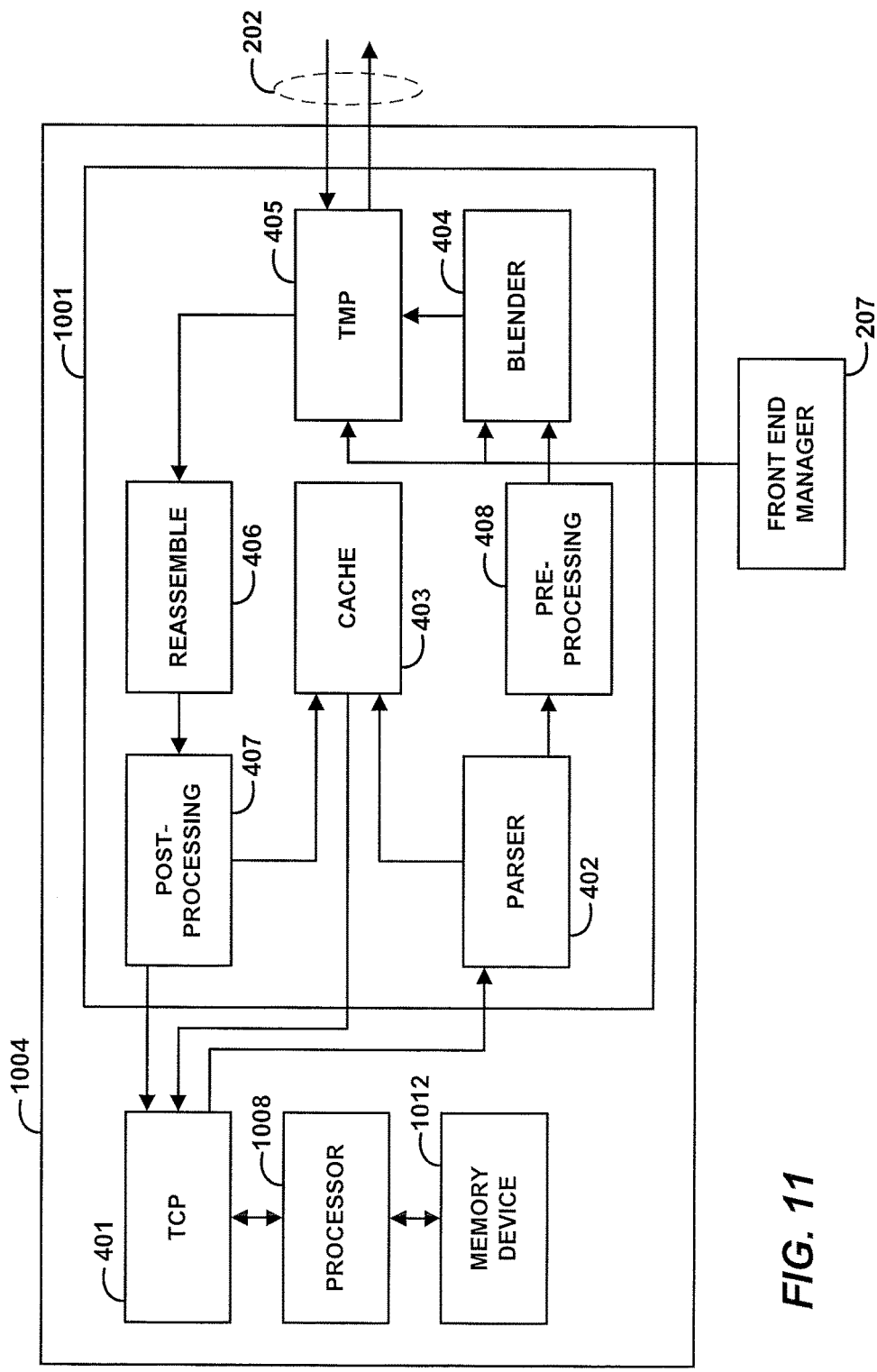
FIG. 11 illustrates in block-diagram form entity relationships in a system in accordance with the present invention.

Elements of an exemplary enhanced client 1004 having a processor 1008 and a memory device 1012 will now be described with regard to FIG. 11. It will be understood that the enhanced client 1004 may my configured in other ways and may include additional components as well. For example, the enhanced client 1004 may comprise one or more processors, memory devices, displays, input devices, output devices, or a combination thereof.

As can be seen, the enhanced client 1104 includes an internal front-end 1001. The internal front-end 1001 may utilize a TCP component 401 of the enhanced client 1104 such as shown. For example, the internal front-end 1001 may utilize one or more devices (such as an Ethernet card for example) and/or software of an enhanced client 1004 for implementing the physical connection layer and IP layer functionality for TCP. In one embodiment, the TCP component 401 may be a network stack of the enhanced client's operating system. Of course, the internal front-end 1001 may also or alternatively utilize its own or an internal TCP component 401. It will be understood that where protocols other than TCP/IP are desired, the TCP component 401 may be replaced or augmented with an appropriate network control process.

As can be seen, the internal front-end 1001 includes similar components of a stand alone front-end mechanism. For instance, the internal front-end may include a parser 402, a data blender 404, a TMP unit 405, a reassemble mechanism 406, a pre-processing mechanism 408, and a post-processing mechanism 407. The internal front-end 1001 may also optionally include a caching mechanism 403 such as described above, to improve performance. In general, like components of the internal front-end will perform similar or the same function as the components described above with regard to the stand alone front-end mechanism.

To illustrate, similar to a stand alone front-end mechanism, the pre-processing mechanism 408 may implement security processes, compression processes, encryption processes, error connection processes, or the like to condition received data for improved performance and functionality. The pre-processing mechanism 408 may also prioritize packets in some embodiments. The data blender 404 may slice and/or coalesce the data portions of received packets into TMP data units that are sized for transport through the TMP unit 405. The data blender 404 may receive information that enables selection of a preferable TMP packet size or a fixed TMP packet size that yields desirable performance may be set. The data blender 404 may mark TMP data units so they can be reassembled when received, serve as a buffer for storing packets, and may associate a prioritization value with each packet if desired.

Also, similar to the stand alone front-end mechanism, the reassemble mechanism 406 utilizes the data portions of subpackets in TMP packets to reassemble the data portions into a form suitable for return to a requesting client. The postprocessing mechanism 407 may perform decompression, decryption, error correction and the like on packets received from a back-end mechanism. In this manner, the post-processing mechanism 407 restores the data that may have been compressed, encrypted, or the like by a back-end mechanism. In general, this restores the data to a usable form or its form before processing by a back-end mechanism.

As stated above, an enhanced client 1004 includes the functionality and/or components of a front-end mechanism. In one or more embodiments, this may occur by including one or more instructions executable by the enhanced client 1004 to provide the functionality of a front-end mechanism. In one embodiment, this may occur by implementing an internal front-end 1001 with one or more instructions stored within or otherwise accessible by the enhanced client 1004. For example, one or more instructions may be stored on a memory device of the enhanced client 1004 or hard wired into the circuitry of the enhanced client's hardware. In one embodiment, the one or more instructions may be machine readable code installed on an enhanced client 1004 or part of an enhanced client's operating system. It is noted that the one or more instructions may be configured to implement one or more or all of the components of an internal front-end 1001 as described above to provide the functionality of a front-end mechanism.

In one embodiment, the one or more instructions are software or drivers executable by a processor of an enhanced client 1004. The internal front-end 1001 may be implemented as a network driver or software for computer running Windows (trademark of Microsoft Corporation), Linux, UNIX, Macintosh OS, Android (trademark of Google Corporation), iOS (trademark of Apple Corporation), or other operating system. In one or more embodiments, the internal front-end 1001 may be part of or come with a default installation of the operating system. Of course, the internal front end 1001 may be installed or included later as well.

In one or more embodiments, the internal front-end 1001 utilizes hardware of the computer (or other client device) to communicate. In other words, the internal front-end 1001 allows existing communications hardware, such as a standard network interface card, to communicate with the advantages of the enhanced link 202 described herein. Typically, these embodiments of the internal front-end 1001 will by implemented as software or machine readable code.

It is noted that in some embodiments, the internal front-end 1001 may be implemented at least partially by hardware. In one or more embodiments, a hardware add-in card or the like may include devices which are hardwired or configured to execute one or more functions of various components of an internal front-end. For example, a hardware add-in card may comprise one or more ASICs, FPGAs, control logic, and/or firmware which allows one or more functions of the internal front-end 1001 to be performed by the add-in card.

To illustrate, in one embodiment, the pre-processing and post-processing mechanism may be implemented in hardware to offload processing from a client's CPU or processor to the internal front-end's hardware components. In this manner, resource intensive tasks such as encryption, error correction, and the like need not be performed by the processor. Of course, other functions of the internal front-end may be offloaded to hardware as well. In addition, it will be understood that functions may be shared between the hardware of an internal front-end and a processor of the client.

It is contemplated that the hardware of an internal front-end may be implemented as an external add-on such as an external device which is connected to a client by a USB, Bluetooth, or other wired or wireless interface/connection. For example, a hardware dongle or the like may be attached to a client when an enhanced link 202 is desired, and detached when not desired. The dongle (or other add-on) may appear to be a standard communications device to the client. In this manner, specialized drivers need not be provided and the add-on may truly be plug-and-play. In operation, the add-on may seamlessly provide the enhanced link 202 between the add-on and a front-end or back-end. The add-on may translate packets to/from the enhanced link 202 to a standard protocol such that the client (and its operating system) may communicate through the enhanced link without modification. In some embodiments, the client may not even know it is communicating through an enhanced link 202 due to this translation.

The dongle or add-on may include its own communications devices. For example, the add-on may have one or more wired or wireless interfaces to establish the enhanced link 202 with a back-end or another enhanced client 1004. It is noted that the add-on may also or alternatively serve as a delivery device for software that provides the front-end capability. For example, the add-on may comprise a memory device (e.g., a flash drive or USB drive) that delivers software to a client automatically, when connected. The software may also be manually accessed/executed from the add-on.

It will be understood that an enhanced client 1004 may comprise a variety of electronic devices. As stated above, an enhanced client 1004 may be a computer or computing device. This includes but is not limited to personal computers, workstations, and servers. This also includes portable devices such as but not limited to smart phones, laptops, netbooks, tablet PCs.

A client may be enhanced by different methods. For example, in one or more embodiments, a client may be enhanced through an automated or automatic process when a user connects to a server, network, or other device which the user wishes to communicate. To illustrate, a client may be enhanced when its user attempts to or connects with a server or other computer within a corporate or other LAN. Once enhanced, the client would then be able to communicate with the benefits of the enhanced link 202 described herein. As described above, communicating via the enhanced link 202 is especially advantageous in low bandwidth and/or high latency connections which may be common place when a user is physically away from the office or a corporate LAN. For example, a business traveler or home user may communicate via a enhanced link 202 once his or her client has been enhanced. Of course, as stated, the enhanced link 202 is beneficial in other situations as well.

A LAN network may have many remote clients on many differing types of WAN links. The services offered to the clients can be delivery of large documents, transactional applications such as database access, or simply web browsing. Many times these applications on a client are optimized for use on the LAN without thought given to possible use across a WAN. These data links may not be well suited for such network services because of propagation delay inherent by the distance of the connection. They may also be not well suited because of low bandwidth such as where the client is connecting through a low bandwidth connection such as DSL, Cable Modem, or even dial-up. Problems with these links can be exacerbated if a VPN connection is used due to the communications overhead resulting from the VPN connection's encryption of data traffic. The links can also be negatively affected by differing MTU sizes that can occur during transmission of the packets over the WAN route.

With an enhanced client 1004, a temporary enhanced link 202 may be established between the client and a LAN network that offers services desired by the user. When the enhanced client 1004 establishes a connection to the LAN for the first time, the client may optionally download the internal front-end 1001 software. The download action may be automated so that the user does not even realize that this is occurring. Alternatively, this action may require user input such as to allow the user to accept or deny installation of the downloaded internal front-end 1001. It is noted that if the user denies installation, a connection to the LAN may still be made but without acceleration or other benefits of the enhanced link 202.

If the internal front-end 1001 is installed and the client enhanced, traffic of a first protocol, such as TCP (or another standard protocol) that is targeted to the desired LAN and only traffic targeted to the connected LAN may be intercepted by the internal front-end 1001 to be communicated across the enhanced link 202. All other TCP traffic on the client may continue to be communicated as before without interruption. The traffic that is intercepted may be defined by rules supplied to the enhanced client 1004 by a back-end mechanism or a front-end manager 207 in one or more embodiments. For example, a back-end mechanism or front-end manager 207 may indicate to an enhanced client 1004 that traffic directed to one or more particular IP addresses, ports, domain names, or the like be intercepted by the internal front-end so that it may be communicated through a enhanced link 202 created by cooperative action between the internal front-end 1001 and a back-end mechanism.

The back-end mechanism may need to have network access to all the corporate services that are to be available via the enhanced link 202. After the traffic is intercepted on the enhanced client 1004, it may be converted into TMP traffic and delivered to the back-end mechanism where it is converted back to TCP for delivery to the server or other device hosting the service. Return traffic from the service may also be converted to TMP traffic for the return trip to the enhanced client 1004 via the enhanced link 202. In this manner, the user benefits from the enhanced link 202 created between the internal front-end 1001 of the enhanced client 1004 and the back-end mechanism 203. In addition, the same benefits of communicating via a stand alone front-end mechanism may be achieved by direct communication between an enhanced client 1004 and the back-end mechanism 203.

This is beneficial in that it allows the useful features of the enhanced link 202 to be extended directly to one or more enhanced clients 1004. For example, accelerated communication, encryption, error correction, quality of service, and security features provided by the enhanced link 202 can now be extended to enhanced clients 1004. Thus for example, unlike with standard clients, data may remain encrypted and take advantage of error correction and security features of the enhanced link 202 until it reaches the enhanced client 1004. Likewise, the data may be encrypted and take advantage of error correction and security features as it is sent from an enhanced client 1004.

As stated, the enhanced link 202 between an internal front-end 1001 and a back-end mechanism 203 may be temporary in one or more embodiments. As described herein, a temporary enhanced link 202 refers to a enhanced link that is created when a connection to one or more services on a LAN are desired by a user, and that is terminated when the services are no longer needed. For example, a temporary enhanced link 202 may be created when a user desires access to his or her corporate email account and terminated when the user is done accessing his or her email or when the user logs out of the email account. Also, for example, a temporary enhanced link 202 may be created when a user requires access to files or data on a LAN and terminated when the files or data the user desires has been transferred. In one or more embodiments, a temporary enhanced link 202 may also or alternatively be terminated after a particular period of time, when connectivity is lost, when a user shuts down or logs out of his or her client device, after a period of inactivity, or if tampering is detected with the enhanced link's connection. Of course, the temporary enhanced link 202 may be terminated for other reasons as well. It is contemplated that either the internal front-end 1001, the back-end mechanism, or both may be configured to terminate a enhanced link 202 for these and other reasons.

Figure 12:
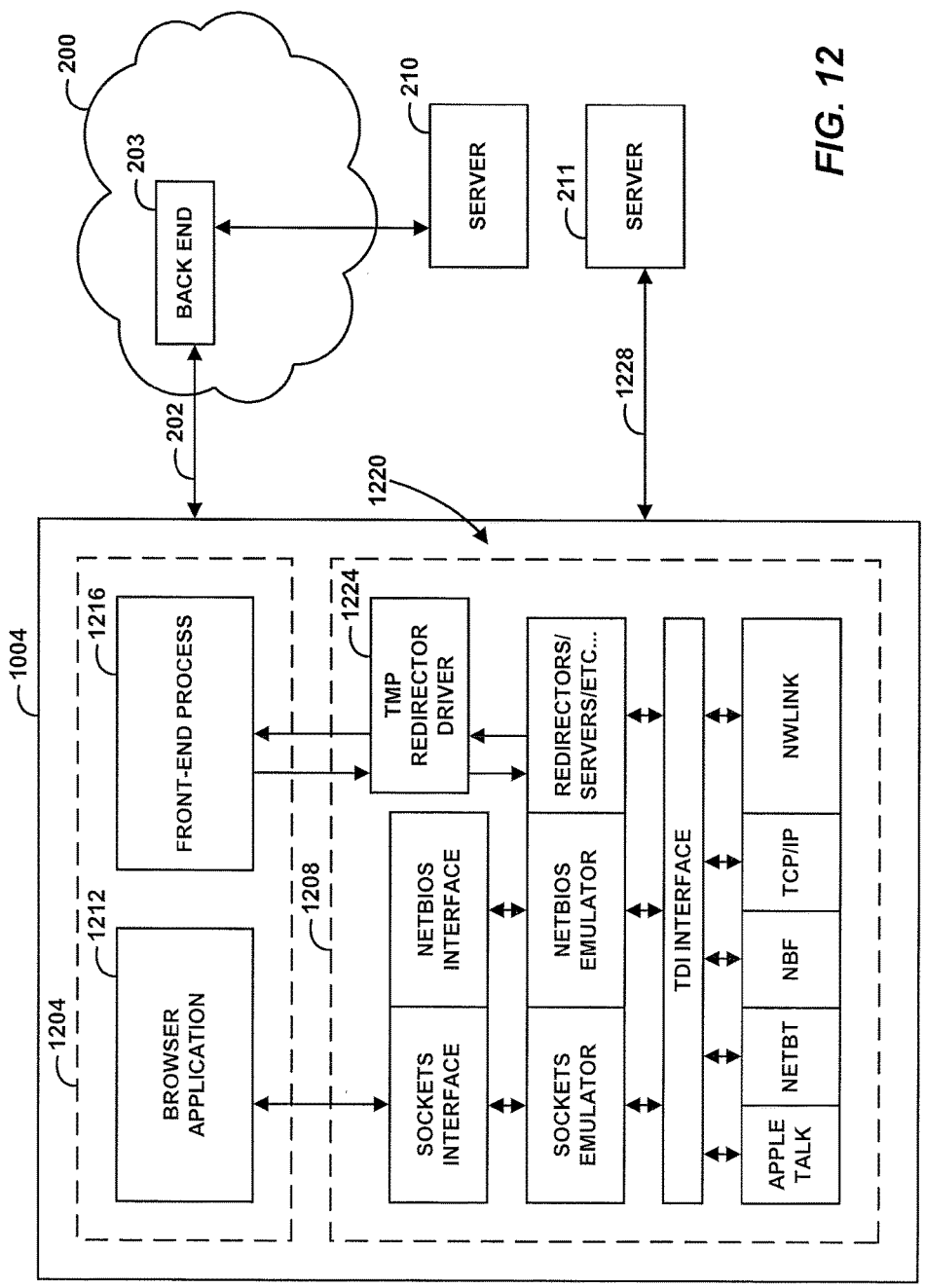
FIG. 12 illustrates in block-diagram form entity relationships in an operating system in accordance with the present invention.

The operation of an internal front-end in connection with an operating system will now be described with regard to FIG. 12. FIG. 12 is a block diagram illustrating the interaction between the internal front-end and an operating system. As will be described further below, the internal front-end's components may be implemented in a front-end process 1216, redirector driver 1224, network stack 1220, or a combination thereof in one or more embodiments. For example, in one or more embodiments, the front-end process 1216 and redirector driver 1224 may comprise various components of the internal front-end, as described above.

It is noted that the operating system shown is one of the Windows family of operating systems. It will be understood that the software may interact with other operating systems. For example, software may interact with driver interfaces, network stacks, or communications layers of other operating systems in the manner described below with regard to the Windows operating system.

As shown by FIG. 12, the enhanced client 1004 has an application space 1204 and a kernel space 1208. In general, applications (i.e. software or programs) run within the application space 1204 supported by services provided by the kernel space 1208. In the figure, a web browser application 1212 and a front-end process 1216 are shown running in the application space 1204. Of course, other applications may also run in the application space 1204. A network stack 1220 may be provided in the kernel space 1208. The network stack 1220 may be configured to provide communication services via TCP/IP or other transport providers (e.g. protocols) through one or more network interface cards or the like. As shown for example, the network stack 1220 includes Appletalk (Trademark of Apple Corporation), NetBT, Nbf, and NWlink as transport providers. Applications running on the operating system may utilize the communications services of the kernel space 1208 to communicate via the transport providers shown. Of course, the kernel space 1208 may provide services for communicating via various transport providers in one or more embodiments.

As can be seen, a web browser application 1212 or other applications may communicate with one or more servers 210 or other devices via a socket interface and TDI (transport driver interface) client of the network stack 1220. This includes standard HTTP traffic over TCP/IP. As shown for example, the web browser application 1212 may communicate through a standard TCP/IP link 1228 to a web or other server 211 by utilizing the network stack 1220.

The web browser application 1212 may also communicate with one or more servers 210 or other devices by utilizing the front-end process 1216. This allows communication over a enhanced link 202 between the enhanced client 1004 and back-end mechanism 203 or server. As described above and illustrated in FIG. 12, the enhanced link 202 may be used to access services provided by a server 210 through the back-end mechanism 203 in this manner.

The front-end process 1216 may be machine readable code configured to allow creation and use of an enhanced link 202 for communication. For example, the front-end service software 1216 may be an application, process, library (such as a DLL), the like, or a combination thereof. In one or more embodiments, the front-end process 1216 provides the functionality of the internal front-end discussed above. This may be accomplished by implementing one or more or all the components of the internal front-end in the front-end process 1216. So configured, the front-end process 1216 may convert data or packets into TMP packets and vice versa. In addition, the front-end process 1216 may provide encryption, error correction, accelerated communication, and caching services as described above. This increases the security, robustness, and speed of network communications. It is noted that the front-end process 1216 or a portion thereof may execute within the kernel space 1208 in some embodiments. For example, the front-end process 1216 or a portion thereof may be implemented in a TDI (transport driver interface) driver or the like running within the kernel space 1208.

The front-end process 1216 may work in cooperation with a redirector driver 1224 to receive, convert, and send TMP packets. The redirector driver 1224 may be configured to intercept and redirect packets to the front-end process 1216 for conversion to TMP packets that may be communicated across a enhanced link 202. In addition, the redirector driver 1224 may convert TMP packets into TCP packets and direct the TCP packets to an application, such as the web browser application 1212. In this manner, an application need not be specially configured to communicate through a enhanced link 202 because the front-end process 1216 and redirector driver 1224 provide packets usable by the application and convert packets from the application into TMP packets. It is contemplated that the redirector driver 1224 may include functionality or components of an internal front-end in one or more embodiments. For example, pre-processing, post-processing, caching or other services of an internal front-end may be provided by the redirector driver 1224. In one or more embodiments, the redirector driver 1224 may be executed within the kernel space 1208.

In operation, a packet or data may be intercepted by the redirector driver 1224 when it reaches the network stack 1220 from an application. The redirector driver 1224 may pass the packet to the front-end process 1216 which converts the packet into a TMP packet. The converted packet may then be returned to the network stack 1220 where it may be sent via a enhanced link 202 to a back-end mechanism 203, such as through a network interface card of the enhanced client 1004. A TMP packet received from the back-end mechanism 203 via the enhanced link 202 may be received by the network stack 1220 and redirected by the redirector driver 1224 to the front-end process 1216 for conversion back to its original state. Once converted, the packet may pass through the network stack 1220 to the application it is being sent to (e.g. the application which requested the packet).

The type of enhanced client and/or its operating system may determine how the data traffic may be intercepted by the redirector driver 1224. For example, if the enhanced client is running Windows XP then the traffic may be intercepted at the TDI NDIS (Transport Driver Interface/Network Driver Interface Specification) layer, while on Windows Vista this would be handled at the WFP (Windows Filtering Platform) layer.

In one or more embodiments, the redirector driver 1224 may be configured to determine which packets to intercept and redirect based on one or more routing rules. For example, data from an application in the application space 1204 may be passed to the network stack 1220. If an attribute of the packet, such as its destination address or port, matches one or more of the rules, the packet may be intercepted and redirected so that it may be sent in an accelerated fashion over a enhanced link 202. In one or more embodiments, the redirector driver 1224 may be configured to examine packets or data received by the network stack and compare one or more attributes (e.g. destination address or port) to one or more routing rules to determine whether the packets or data should be intercepted and redirected.

It is noted that the routing rules may define various matching attributes in addition to address and/or port matching. For example, a matching attribute may be the type of protocol used by a packet, quality of service requirements for a packet, the size of the packet, or the type of information contained in the packet. In one or more embodiments, the routing rules may define matching attributes comprising one or more particular applications. In this manner, traffic to and/or from a particular application may be intercepted and redirected. For example, the matching attributes may comprise a process ID or process name indicating the source (or destination) of the packet.

Also or alternatively, the rules may define the IP address of all services to be accelerated and/or one or more ports to be accelerated over a enhanced link 202. For example, if a web application uses database transactions or other protocols other than HTTP for delivering the web page, these services protocols may be accelerated and optimized through a enhanced link 202 as well.

Routing rules may be provided to an enhanced client in various ways. For example, a back-end mechanism 203 may provide one or more rules that define what traffic will be accelerated by a enhanced link 202 between the client laptop and a LAN. In one or more embodiments, the redirector driver 1224 may be in communication with a back-end mechanism 203 or front-end manager to receive the rules. In other embodiments, the redirector driver 1224 may receive the rules from the front-end process 1216 which may be in communication with the back-end mechanism 203 or front-end manager. In some embodiments, a user may input one or more rules or the rules may be provided in a data file in the client. In these embodiments, the redirector driver 1224 need not receive rules from a source external to the client. The one or more rules may be stored on a memory device of the enhanced client in one or more embodiments.

It is contemplated that an application may be configured to take advantage of an enhanced protocol, such as TMP, and an enhanced link in some embodiments. For example, an internal front-end or front-end process may be exposed to application developers via an API. In this manner, a developer may write applications that utilize the enhanced protocol and an enhanced link. This is advantageous in that packets or other data may then be directly passed to and from an internal back-end or front-end. Resource utilization may thus be reduced by reducing or eliminating at least some of the processing required to route data to an internal back-end or front-end. In addition, the number of times data traverses the network stack may be reduced in this manner.

As stated, the internal front-end may be used to create enhanced clients from standard clients. In one or more embodiments, this may occur by installing the internal front-end (including any hardware and/or software of the internal front-end) on the client. An automated install of an internal front-end may occur in some embodiments. For example, in one embodiment, when a client connects to a corporate LAN, the corporate LAN may notify a client that front-end software may be installed for accelerated/enhanced communication between the client and the corporate LAN. This may occur through a message provided to the user of the client machine. Internal front-end software may then be automatically downloaded by the client as a result of communication from the corporate LAN. In one embodiment, the corporate LAN or server thereof may cause a download trigger, such as an "Install" or "Download" button or link to be presented on the client. The download trigger allows the internal front-end to be easily downloaded and/or installed on a client. It is noted that, in some corporate LANs, services provided by the corporate LANs may not be accessible unless the client has or installs a front-end mechanism. Thus, if a user declines installation of the internal front-end, he or she may be denied access to the corporate LAN. It is noted that in some embodiments, access to the corporate LAN may be permitted without installation of the internal front-end, but such access will not take advantage of the benefits provided by an enhanced link 202 and the TMP protocol.

In an exemplary embodiment, a user may connect to a web site offered by the corporate LAN over a remote connection, such as a hotel, home, or other public or private access point remote from the corporate LAN. Upon connecting to the web site with Internet Explorer (trademark of Microsoft Corporation) the user may be prompted to allow installation of an ActiveX (trademark of Microsoft Corporation) component including the internal front-end. Once installed, the ActiveX component may intercept the data traffic between the user's client (e.g. laptop or workstation computer) and the corporate web server. This traffic may then be accelerated between the user's machine and the corporate website by converting the traffic to one or more TMP packets for communication through an enhanced link.

In this example, the corporate web server may provide the ActiveX control and define the parameters of this control, such as by providing the administrative and configuration services described above with regard to a back-end mechanism or front-end manager. In addition, the web server may be configured to provide one or more routing rules to define what traffic is accelerated/enhanced via an enhanced link. Of course, other installation schemes, automated or not, may be utilized to enhance a client. For example, the internal front-end may be provided as an executable file or files which a user may download and install on his or her client. In some embodiments, the internal front-end may be installed and a client enhanced without knowledge of a user. For example, a client administrator may cause the internal front-end to be installed remotely or the internal front-end may be installed as part of an automated update to the client's software and/or operating system.

It is noted that an internal front-end of limited functionality may be provided in one or more embodiments. For example, the internal front-end may be limited to downloading files or from a server or other source via an enhanced link. The internal front-end may also be limited to downloading files or other particular data from one or more particular servers. The limited front-end may be provided a reduced or no cost to users. For example, a website offering large files for download may provide the limited internal front-end to increase efficiency and speed of downloads. The internal front-end may be limited in other ways as well. For example, the internal front-end may be limited to file or data uploads via an enhanced link.

Figure 13:
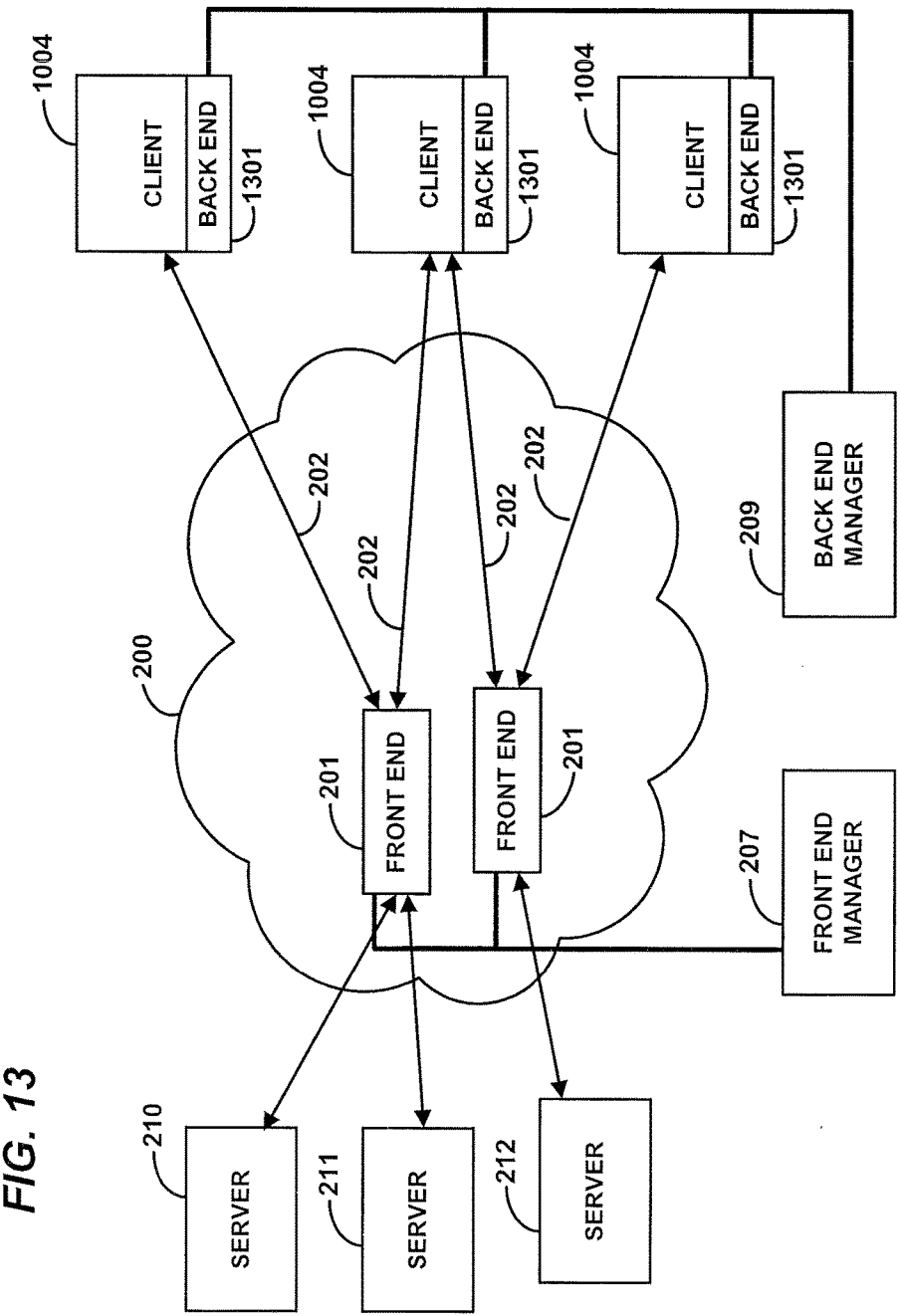
FIG. 13 illustrates a general distributed computing environment in which the present invention is implemented.

Referring now to FIG. 13, it can be seen that an enhanced client 1004 may comprise an internal back-end 1301 in one or more embodiments. In this manner, an enhanced client 1004 may establish an enhanced link 202 directly with one or more front-ends 201. The enhanced client 1004 may also or alternatively establish an enhanced link 202 directly with another enhanced client, such as an enhanced client comprising an internal front-end. The internal back-end 1301 may communicate with a back-end manager 209 in some embodiments. For example, administrative and configuration information for an internal back-end 1301 may be maintained or updated via a back-end manager 209. Like the internal front-end, the internal back-end 1301 extends the enhanced link 202 directly to the enhanced client 1004. In this way, accelerated communication, encryption, error correction, quality of service, and security features may be extended to the enhanced client 1004.

Figure 14:
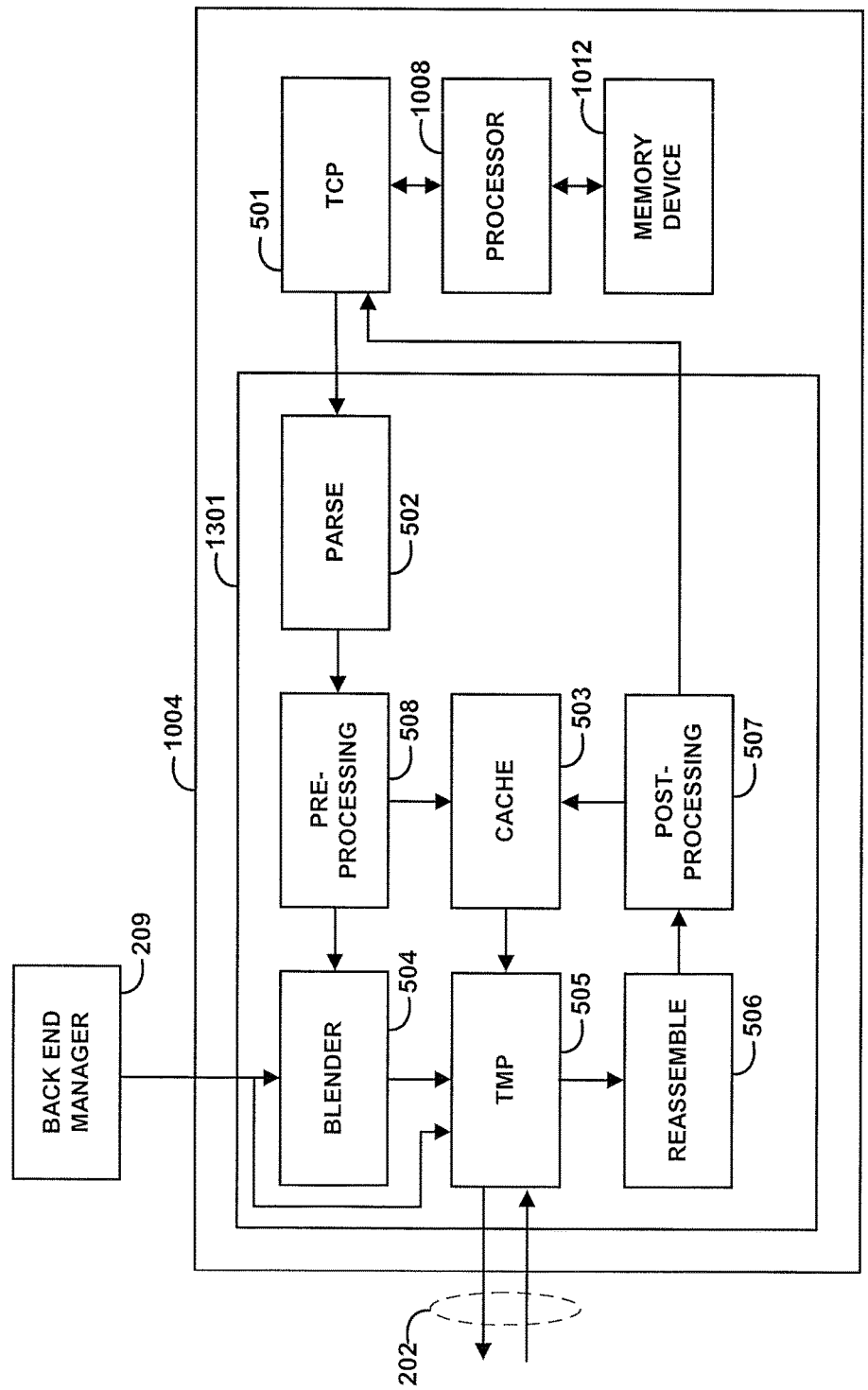
FIG. 14 illustrates in block-diagram form entity relationships in a system in accordance with the present invention.

FIG. 14 shows elements of an exemplary enhanced client 1004 having an internal back-end 1301. As described above, the enhanced client 1004 may comprise a processor 1008 and a memory device 1012. The internal back-end 1301 may utilize these (and other) components of the enhanced client 1004 during operation. For example, the internal back-end 1301 may utilize a TCP component 501 of an enhanced client 1004, such as the hardware and/or software stack used to provide TCP functionality at the client. It is noted that the internal back-end 1301 may include its own TCP component and may utilize such component (rather than the TCP component of the enhanced client 1004) in some embodiments.

Like the back-end 203 described above, the internal back-end 1301 may be configured to translate TMP packets to TCP packets, and vice versa. Accordingly, the internal back-end 1301 may be configured similarly to a stand-alone back-end 203. For example, the internal back-end 1301 may comprise a blender 504, pre-processing mechanism 508, parser 502, TMP unit 505, reassemble mechanism 506, and a post-processing mechanism 507. The internal back-end 1301 may optionally comprise a cache 503 to cache data packets to improve performance, such as described above.

The components of the internal back-end 1301 may provide the same or similar functionality as those found in a stand alone back-end 203. For example, the TMP unit 505 may receive TMP packets from an enhanced link 202 and pass them to a reassemble mechanism 506, which reassembles the packets into corresponding TCP packets. The postprocessing mechanism 507 may perform decompression, decryption, error correction or the like to restore data processed by and received from a front-end, such as described above with regard to FIG. 11. Likewise, the preprocessing mechanism 508 may perform compression, encryption, error compression and the like on data to be transmitted by the internal back-end, and forward such data to the data blender 504. As described above, data blender 504 may then buffer and prioritize data in a manner efficient for transmission over the enhanced link. A back-end manager 209 may be used to maintain or update the manner in which the data blender 504 prioritizes data. The data may then be passed to the TCP unit 501 and subsequently used by the processor 1008 or other component of the enhanced client 1004.

As stated, the internal front-end 1001 may comprise hardware, software, or both that is used to enhance a client. It is contemplated that the internal back-end 1301 may enhance a client in a similar or the same manner. For example, like the internal front-end 1001, an internal back-end 1301 may be installed through an automated process, or be implemented (at least in part) by a hardware add-on or dongle. Also, data may be routed to the internal back-end 1301 or the internal back-end may intercept data based on its source, type (e.g., TMP vs. TCP), or other characteristics. The routing or interception of data may be defined by rules supplied to the enhanced client 1004, as described above. Such rules may be provided by a user directly, through a back-end manager 209, or through a front-end mechanism (that the internal back-end is communicating with) in some embodiments.

Figure 15:
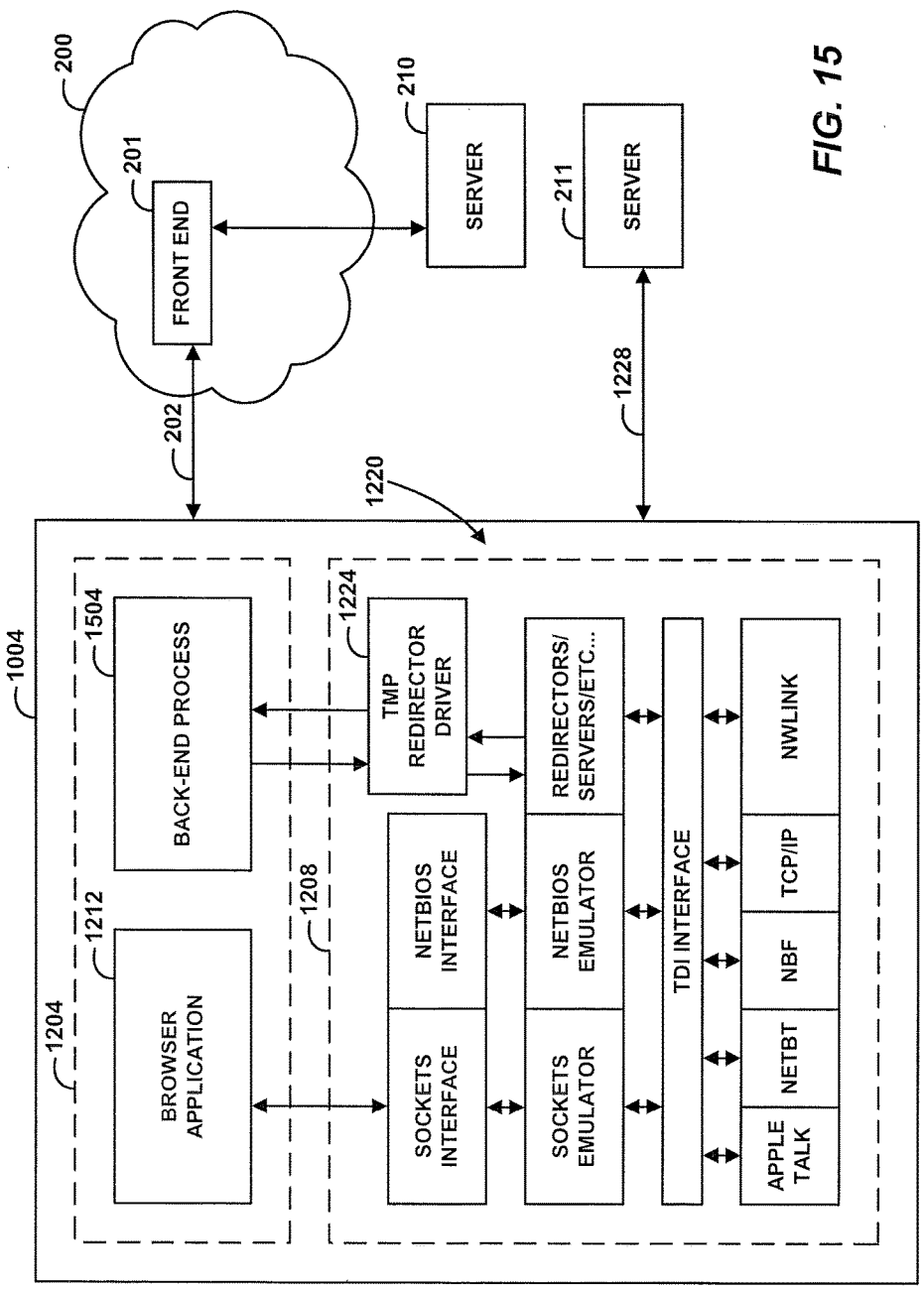
FIG. 15 illustrates in block-diagram form entity relationships in an operating system in accordance with the present invention.

FIG. 15 illustrates operation of an exemplary internal back-end with respect to an operating system. As can be seen, the internal back-end may be a back-end process 1304 in the application space 1204 of an operating system. The back-end process 1304 may utilize a network stack 1220 configured to provide communications services to applications in the application space 1204, such as described above with regard to FIG. 12. The back-end process 1304 may work in concert with a redirector driver 1224 to receive, convert, and send TMP packets, as is also described above with regard to FIG. 12. For example, the redirector driver 1224 may receive or intercept TMP packets and pass them to the back-end process 1304 for translation. The translated packets may then be sent back through the network stack 1220 to an application, such as the browser 1212 shown. In addition, TCP packets may be intercepted by the redirector driver 1224 and passed to the back-end process 1304 for conversion to TMP packets. The TMP packets may then be communicated over the enhanced link 202. It is contemplated that the TMP packets may also be returned to the network stack 1220 and communicated over an enhanced link 202 by the network stack.

Figure 16:
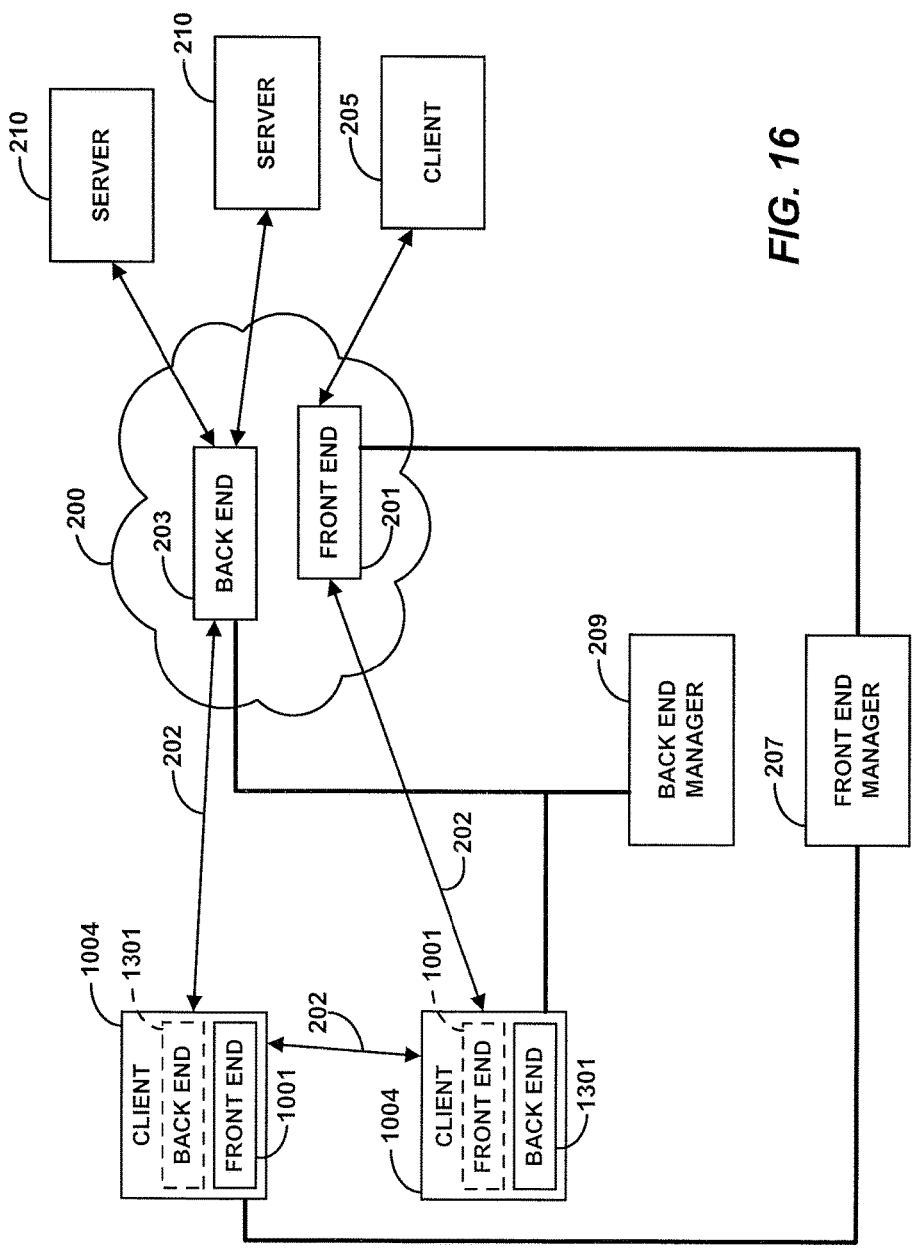
FIG. 16 illustrates a general distributed computing environment in which the present invention is implemented.

FIG. 16 illustrates an exemplary network environment including enhanced clients 1004. As can be seen, enhanced clients 1004 with internal back-ends 1301 and internal front-ends 1001 may establish and communicate directly through an enhanced link 202. As can also be seen, the enhanced clients 1004 may also communicate with stand-alone front-ends 201 or stand-alone back-ends 203, with their internal back-end 1301 and internal front-end 1001 respectively. An enhanced client 1004 may utilize these stand-alone front-ends 201 or stand-alone back-ends 203 to communicate with one or more non-enhanced clients 205 or servers 210, such as described above.

As can be seen from FIG. 16, enhanced clients 1004 may optionally have both an internal front-end 1001 and an internal back-end 1301. An enhanced client 1004 with both an internal front-end 1001 and an internal back-end 1301 may communicate respectively with various back-ends 201 and various front-ends 203. In addition, such an enhanced client 1004 may communicate with another enhanced client having only an internal front-end 1004, only an internal back-end 1301, or having both.

As can be seen, the dynamic network link acceleration method and apparatus herein provides an enhanced link 202 that may be established as desired between an enhanced client 1004 and another enhanced client, a front-end mechanism, or a back-end mechanism 203. Where a client does not have front-end or back-end services installed, an internal front-end or back-end comprising machine readable instruction code may be automatically provided/installed or the user may download and install the software.

The internal front-ends and back-ends described herein may be used to establish peer to peer networks or links in one or more embodiments. For example, two or more enhanced clients may establish a peer to peer connection through an enhanced link. Packets communicated between the enhanced clients may then be encrypted, prioritized, compressed, accelerated and the like using the TMP protocol. The enhanced clients may be portable devices, such as laptops, in one or more embodiments.

It is contemplated that an internal front-end or back-end may include auto-discovery capabilities in one or more embodiments. For example, an internal front-end may be able to automatically discover or detect other front-end mechanisms, or back-end mechanisms. One or more enhanced links may then be established between pairs of front-end and back-end mechanisms. To illustrate, enhanced clients, such as laptops, may auto-discover one another. Subsequently, one or more enhanced links may be established (manually or automatically) between the enhanced clients.

The auto-discovery may be used for general networking and communication. Alternatively, the auto-discovery may be used for particular applications. For example, a meeting or collaboration application may auto-discover other enhanced clients and include their users in the meeting or collaboration. A peer to peer network including the meeting participants may then be established. The participants or users may then work together such as by sharing documents, editing documents or whiteboarding. This is advantageous in that it allows an enhanced link to be easily setup between enhanced clients. As discussed above, the enhanced link may be used to increase data transfer efficiency, secure, and prioritize data packets between the enhanced clients, among other things.

Enhanced clients may also be configured to accelerate data transfers on a per file basis. For example, individual files may have a transparent wrapper or other associated configuration data that defines settings for an enhanced link to accelerate the data transfer. Individual files may also be optimized for data transfer.

In addition or alternatively, the internal front-end or back-end may be configured to index one or more data files on the enhanced client. Prior to downloading a file (or portions thereof) the enhanced client may query the index to determine if parts of the file or the entire file is already one the enhanced client. Only the portions that are not yet on the enhanced client may then be downloaded or transmitted. In one or more embodiments, the data source may send and index of available files, and an enhanced client may select only those files which are not already on the enhanced client for download.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for dynamically accelerating network links between a client computing device and a back-end server comprising the steps of:

receiving a request at said back-end server from said client computing device in a first communication protocol using packets of first type generated by said client computing device to establish a communication link between said client computing device and said back-end server;

transmitting to said client computing device machine readable code configured to implement a front-end mechanism at said client computing device, said front-end mechanism configured to encode packets of said first type generated by said client computing device into encoded packets of a second type, said machine readable code including routing rules defining which of said data packets of said first type are to be encoded into packets of said second type for transmission over an enhanced communication link between said client computing device and said back-end server;

establishing said enhanced communication link between said client computing device and said back-end server;

encoding data traffic from the back-end server into one or more encoded packets of said second type for communication to the front-end mechanism of the client computing device through the enhanced communication link;

receiving one or more encoded packets of said second type comprising data traffic from the client computing device which was intercepted by said front-end mechanism and transmitted through the enhanced communication link based upon said routing rules;

decoding the one or more encoded packets comprising data traffic from the client computing device at the back-end server to restore the data traffic from the client computing device for use by the back-end server; and receiving quality of service information about the enhanced communication link from the client computing device at the back-end server.

2. The method in accordance with claim 1 further comprising generating a prompt at said client computing device before transmitting said machine readable code to said client device, wherein if a user of said client computing device provides a required input in response to said prompt, then transmitting said machine readable code to said client computing device.

3. The method in accordance with claim 2 wherein said prompt comprises a request displayed to said user via a display device of said client computing device.

4. The method in accordance with claim 1 further comprising terminating communications with said back-end server if said user does not provide said required input.

5. The method in accordance with claim 1 wherein said machine-readable code comprises one or more executable files.

6. The method in accordance with claim 1 wherein said front-end mechanism is configured to intercept and encode packets of said first type intended for transmission to said back-end server but not intercept packets of said first type intended for transmission to other destinations.

* * * * *